United States Patent
Zhang et al.

(10) Patent No.: US 11,765,616 B2
(45) Date of Patent: Sep. 19, 2023

(54) METHODS, APPARATUS, AND SYSTEMS FOR UE COOPERATION WITH UE RELAYING

(71) Applicants: Liqing Zhang, Ottawa (CA); Hua Xu, Ottawa (CA); Jianglei Ma, Ottawa (CA)

(72) Inventors: Liqing Zhang, Ottawa (CA); Hua Xu, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/097,347

(22) Filed: Nov. 13, 2020

(65) Prior Publication Data
US 2021/0153063 A1 May 20, 2021

Related U.S. Application Data

(60) Provisional application No. 62/937,540, filed on Nov. 19, 2019.

(51) Int. Cl.
*H04W 80/02* (2009.01)
*H04W 28/02* (2009.01)
(Continued)

(52) U.S. Cl.
CPC ....... *H04W 28/0263* (2013.01); *H04W 76/14* (2018.02); *H04W 80/02* (2013.01); *H04W 88/04* (2013.01)

(58) Field of Classification Search
CPC ......... H04W 28/0263; H04W 72/1263; H04W 76/11; H04W 76/14; H04W 76/15; H04W 80/02; H04W 88/04
(Continued)

(56) References Cited

U.S. PATENT DOCUMENTS

2017/0353883 A1   12/2017  Tenny et al.
2018/0227282 A1*  8/2018   Lee .................. H04W 76/15
(Continued)

FOREIGN PATENT DOCUMENTS

CN    101827449 A    9/2010
CN    108617024 A   10/2018
(Continued)

OTHER PUBLICATIONS

Huawei, HiSilicon, "Further views on Rel-17 work area on NR sidelink enhancements for V2X and other use cases", 3GPP TSG RAN Meeting #85, Newport Beach, USA, Sep. 16-20, 2019, RP-191831, 13 pages.
(Continued)

*Primary Examiner* — Harun Chowdhury

(57) ABSTRACT

Signaling to enable relay-based user equipment (UE) cooperation (UC) by a group of UEs, and a configuration including an adaptation protocol for processing of UC bearer traffic, are communicated in a wireless communication network. The UC bearer traffic includes a UC bearer and UC bearer attributes, and the UC bearer includes either a split bearer or a duplicated bearer indicated in the UC bearer attributes. In some embodiments, wireless network connectivity that is available for a relay link is determined, and the adaptation protocol is determined based on the determined connectivity. Signaling to enable configuration of the relay link in accordance with the connectivity and the adaptation protocol is communicated. A UE may receive signaling to configure the UE for such a relay link, and communicates traffic between a remote UE and the wireless communication network over the relay link.

10 Claims, 23 Drawing Sheets

(51) Int. Cl.
*H04W 88/04* (2009.01)
*H04W 76/14* (2018.01)

(58) Field of Classification Search
USPC .......................................... 370/315, 329, 474
See application file for complete search history.

(56) References Cited

U.S. PATENT DOCUMENTS

2018/0234524 A1\* 8/2018 Cheng .................... H04W 76/15
2019/0261450 A1\* 8/2019 Adachi ................. H04W 76/11

FOREIGN PATENT DOCUMENTS

| EP | 3500046 A1 | 6/2019 |
| JP | 2019517751 A | 6/2019 |
| WO | 2017206709 A1 | 12/2017 |
| WO | 2019080800 A1 | 5/2019 |

OTHER PUBLICATIONS

Huawei, HiSilicon, "Discussion on other UE capabilities of E-UTRA connected to 5GC", 3GPP TSG RAN2 Meeting #103, Gothenburg, Sweden, Aug. 20-24, 2018, R2-1812718, 7 pages.
"3rd Generation Partnership Project; Technical Specification Group Radio Access Network; Study on further enhancements to LTE Device to Device (D2D), User Equipment (UE) to network relays for Internet of Things (IoT) and wearables (Release 15)", 3GPP TR 36. 746, vol. RAN WG2, No. V15.1.1, Apr. 15, 2018, pp. 1-55.

\* cited by examiner

METHODS, APPARATUS, AND SYSTEMS FOR UE COOPERATION WITH UE RELAYING

CROSS-REFERENCE TO RELATED APPLICATION

This application is related to, and claims the benefit of, U.S. Provisional Application No. 62/937,540, filed on Nov. 19, 2019, the entire contents of which are incorporated herein by reference.

FIELD

This application relates generally to communications in a wireless communication network, and in particular to communications that involve User Equipment (UE) cooperation and UE relaying.

BACKGROUND

In Long Term Evolution (LTE), Device to Device (D2D) techniques in which UEs communicate directly with each other were studied and specified. Research focus in LTE D2D was primarily on the communications between the D2D devices. For New Radio (NR) Vehicle to anything (V2X) scenarios, D2D-related research is focused on "Uu link" transmissions between a gNodeB (gNB) and UEs, and on sidelink (SL) transmissions between UEs.

UE cooperation is a communication technique that focuses on cooperative procedures among UEs in a group of UEs. UE cooperation can be used to enhance system throughout, coverage, and capacity, and may also improve communication latency and reliability. UE cooperation can benefit scenarios such as V2X, as well as others such as enhanced Mobile Broadband (eMBB) and Ultra-Reliable Low Latency Communication (URLLC).

UE cooperation may be achieved by a group of UEs helping each other with either or both of Uu link transmissions and sidelink transmissions. UE cooperation involves interactions among the UEs in a group for the purpose of transmission and reception.

Relay is another technology relevant to the above scenarios, and is widely used to improve the coverage of a wireless access network. A relay node is mainly deployed by operators at a fixed site. So-called "UE relay" provided a more flexible alternative. There are different types of UE relays, including Layer 2 (L2) and Layer 3 (L3) relays. Some current mobile relay techniques are used only to satisfy urgent needs such as basic public safety, where the data rate is low and the latency requirement is not very high.

Other relay-based techniques that are more generally suited to various scenarios or applications and to potentially improving communication system performance may be desirable.

SUMMARY

Techniques that involve user equipment (UE) cooperation (UC) with UE relay to improve relay link and system performance are rare, especially for usage cases or scenarios such as in-coverage and out-of-coverage scenarios. For UC, more than one UE in a UC group may help each other by forwarding traffic for other UE(s) and communicating with a wireless network, via one or more paths/routes over one or more hops (e.g., relay UEs) from an initially transmitting end to a final reception end.

A first aspect of the present disclosure relates to a method for a relay UE. The method involves receiving signaling to enable relay-based UE cooperation (UC) by a group of UEs, and receiving a configuration. The group of UEs includes the relay UE and a remote UE. The configuration includes adaptation information for processing of UC bearer traffic. The UC bearer traffic includes a UC bearer and UC bearer attributes, and the UC bearer includes either a split packet data convergence protocol (PDCP) bearer or a duplicated PDCP bearer indicated in the UC bearer attributes. The method further includes communicating the UC bearer traffic with the remote UE.

In an embodiment of the first aspect, the UC bearer attributes include any one or more of: a UC bearer identity; a UC bearer index; one or more destination identifiers; one or more source identifiers; a total number of UC bearer streams processed from the associated PDCP bearer; an indication of whether the UC bearer comprises a split PDCP bearer or a duplicated PDCP bearer; an indication of an identifier of a relay path or route; an indication of a total number of UC paths or routes for a UE; an indication of a time stamp or adaptation reference at each adaptation processing point over relaying; an indication as to UC or relay only traffic; an indication to a control operation.

In an embodiment of the first aspect or further to the previous embodiment, communicating the UC bearer traffic with the remote UE comprises relaying the UC bearer traffic. The relaying includes physical (PHY), media access control (MAC), radio link control (RLC), and adaptation protocol (AP) layer processing, and forwarding the UC bearer traffic based on the UC bearer attributes.

In a further embodiment of the previous embodiment, the method further includes receiving the UC bearer traffic over a first air interface. The UC bearer traffic is associated with PHY, MAC, and RLC layer contexts of the first air interface. The method further includes converting the UC bearer traffic to be associated with respective PHY, MAC, and RLC layer contexts of a second air interface of a different type than the first air interface.

A second aspect of the present disclosure relates to a relay UE apparatus. The apparatus includes a communication interface; a processor, coupled to the communication interface; and a non-transitory computer readable storage medium, coupled to the processor, storing programming for execution by the processor. The programming includes instructions to perform a method of the first aspect or of any embodiment thereof.

A third aspect of the present disclosure relates to a method for a remote UE. The method involves receiving signaling to enable relay-based UE cooperation (UC) by a group of UEs, and receiving a configuration. The group of UEs includes the remote UE and a relay UE. The configuration includes adaptation information for processing of UC bearer traffic. The UC bearer traffic includes a UC bearer and UC bearer attributes, and the UC bearer includes either a split packet data convergence protocol (PDCP) bearer or a duplicated PDCP bearer indicated in the UC bearer attributes. The method further includes communicating the UC bearer traffic with the relay UE.

In an embodiment of the third aspect, the UC bearer attributes include any one or more of: a UC bearer identity; a UC bearer index; one or more destination identifiers; one or more source identifiers; a total number of UC bearer streams processed from the associated PDCP bearer; an indication of whether the UC bearer comprises a split PDCP bearer or a duplicated PDCP bearer; an indication of an identifier of a relay path or route; an indication of a total number of UC paths or routes for a UE; an indication of a time stamp or adaptation reference at each adaptation processing point over relaying; an indication as to UC or relay only traffic; an indication to a control operation.

In an embodiment of the third aspect, communicating the UC bearer traffic with the relay UE comprises receiving the UC bearer traffic; and aggregating the split PDCP bearer or conducting joint detection of the duplicated PDCP bearer in the UC bearer traffic.

In an embodiment of the third aspect, communicating the UC bearer traffic with the relay UE comprises splitting or duplicating the PDCP bearer to generate the UC bearer traffic; and transmitting the UC bearer traffic.

A fourth aspect of the present disclosure relates to a remote UE apparatus. The apparatus includes a communication interface; a processor, coupled to the communication interface; and a non-transitory computer readable storage medium, coupled to the processor, storing programming for execution by the processor. The programming includes instructions to perform a method of the third aspect or of any embodiment thereof.

A fifth aspect of the present disclosure relates to a method for a base station. The method involves transmitting signaling to enable relay-based UE cooperation (UC) by a group of UEs, and transmitting a configuration. The group of UEs includes a remote UE and a relay UE. The configuration includes adaptation information for processing of UC bearer traffic. The UC bearer traffic includes a UC bearer and UC bearer attributes, and the UC bearer includes either a split packet data convergence protocol (PDCP) bearer or a duplicated PDCP bearer indicated in the UC bearer attributes. The method further includes communicating the UC bearer traffic with either one or both of the relay UE and the remote UE.

A sixth aspect of the present disclosure relates to a base station apparatus. The apparatus includes a communication interface; a processor, coupled to the communication interface; and a non-transitory computer readable storage medium, coupled to the processor, storing programming for execution by the processor. The programming includes instructions to perform a method that involves transmitting signaling to enable relay-based UC by a group of UEs, and transmitting a configuration. As noted above, the group of UEs includes a relay UE and a remote UE, and the configuration includes an adaptation protocol for processing of UC bearer traffic. The UC bearer traffic includes a UC bearer and UC bearer attributes, and the UC bearer includes either a split PDCP bearer or a duplicated PDCP bearer. The split or duplicated PDCP bearer is indicated in the UC bearer attributes. The instructions further include communicating the UC bearer traffic with either one or both of the relay UE and the remote UE.

Another aspect relates to a computer program product comprising a non-transitory computer readable storage medium storing such programming, including instructions to perform such a method. As described above, in an embodiment the method involves communicating, in a wireless communication network, signaling to enable relay-based UC by a group of UEs, and a configuration that includes an adaptation protocol for processing of UC bearer traffic. The UC bearer traffic includes a UC bearer and UC bearer attributes, and the UC bearer includes either a split PDCP bearer or a duplicated PDCP bearer indicated in the UC bearer attributes. The group of UEs includes a relay UE and a remote UE.

A further aspect of the present disclosure relates to a method that involves determining wireless network connectivity that is available for a relay link between a UE and a wireless communication network; determining an adaptation protocol, based on the determined connectivity, to adapt a protocol stack architecture associated with the determined connectivity to supporting the relay link; and communicating signaling to enable configuration of the relay link in accordance with the connectivity and the adaptation protocol.

Another method involves receiving, by a UE, signaling to configure the UE for a relay link between a remote UE and a wireless communication network in accordance with wireless network connectivity that is available for the relay link and an adaptation protocol that is based on the connectivity to adapt a protocol stack architecture associated with the determined connectivity to supporting the relay link; and communicating, by the UE, traffic between the remote UE and the wireless communication network over the relay link.

A further aspect of the present disclosure relates to an apparatus that includes a communication interface; a processor, coupled to the communication interface; and a non-transitory computer readable storage medium, coupled to the processor, storing programming for execution by the processor, the programming including instructions to perform one of these methods.

Another aspect relates to a computer program product comprising a non-transitory computer readable storage medium storing programming, the programming including instructions to perform one of these methods.

Other aspects and features of embodiments of the present disclosure will become apparent to those ordinarily skilled in the art upon review of the following description.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION

Figure 1:
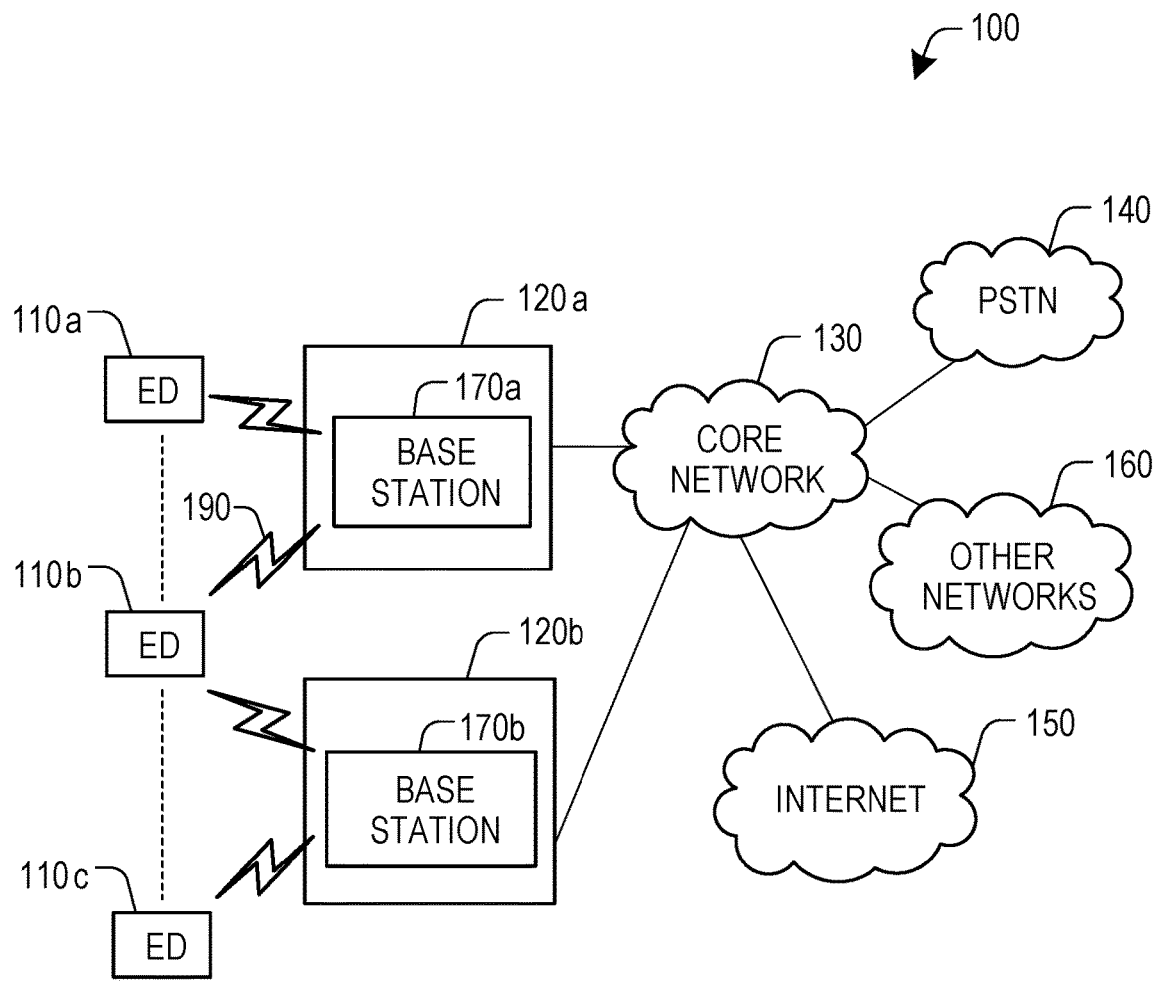
FIG. 1 illustrates an example communication system in which aspects of the present disclosure are implemented in some embodiments.

UE cooperation with UE relay may be used, for example, for such purposes as improving system performance in latency or throughput for emerging and important applications. Examples of new use cases for UE cooperation with UE relay include video monitoring and feedback for industrial manufacturing or use by public authorities such as firefighters or police in providing enhanced public safety. These use cases, or others, may require higher data throughput, at a level of tens of Megabits per second (Mbps) for example, and low latency, on the order of milliseconds (ms) for example, that cannot be satisfied by current UE relay link designs. UE cooperation with UE relay as disclosed herein may provide a feasible solution and satisfy both higher throughput and lower latency needs.

L3 and L2 relays are referenced above. With an L3 relay adaptation layer at the Internet Protocol (IP) layer for example, traffic may be processed in a remote UE, a relay UE, and core network equipment, while relayed traffic to the remote UE is transparent to a base station. In an L2 relay, an adaptation layer is located between Packet Data Convergence Protocol (PDCP) and Radio Link Control (RLC) layers in some embodiments. A base station is aware of the relaying traffic to the remote UE via the relay UE, and has full control of relaying activity. A base station can be any device performing control and scheduling, transmission and receiving signals; for example, an LTE base station (or eNB), an NR base station (or gNB), or a Transmission Reception Point (TRP), etc. Other examples of network equipment such as a base station are also provided herein.

The above reference to an adaptation layer being located between PDCP and RLC layers relates to a protocol stack, and it should be appreciated that not all elements or components that are involved in a relay link necessarily implement a PDCP layer. For example, relay UEs may implement processing at an adaptation layer above an RLC layer without implement PDCP layer processing.

In a session of a UE application, a logical flow pipe used for transmitting such traffic in the network may be known as a "bearer", which may also be interchangeably referred to as a "radio bearer" or "traffic bearer" herein. The bearer optionally includes quality of service (QoS) requirements associated with the session. A radio bearer may in general have two types: (user) dedicated radio bearer (DRB) and signaling radio bearer (SRB). A DRB is used to transmit the user data traffic (a DRB is sometimes informally referred to as user data traffic). An SRB is used to transmit control messages such as higher-layer signaling or configuration messages (SRBs are sometimes informally referred to as control messages or signaling messages). A UE cooperation bearer (UC bearer or UC radio bearer) is defined herein as a "split" bearer (e.g., a split of PDCP DRB(s) and/or SRB(s) or a split of PDCP bearer or bearers); OR as a "duplicated" bearer (e.g., a duplication of PDCP bearer(s) or a duplication of PDCP DRB(s) and/or PDCP SRB(s)). A "split" operation associated with a split bearer may also be called a multiplexing operation, and a split bearer may also be called a multiplexed bearer.

An adaptation protocol (AP) or adaptation information, for example, can be functionally considered here as part of a PDCP enhanced feature when a split or duplication of PDCP bearer(s) (or PDCP context, PDCP bearer context) is formed, called UE cooperation (UC) bearer when UC is configured. The AP is used to provide additional information, also referred to herein as a UC bearer attribute or UC bearer attributes, to describe newly formed UC traffic, also referred to herein as UC bearer traffic, for relaying, switching, and/or routing towards a destination. A destination may be a UE or a network device.

In an embodiment, a PDCP bearer includes (user) data radio bearer (DRB) and signaling radio bearer (SRB), and thus a split PDCP bearer or duplicated PDCP bearer is either split DRB/SRB or duplicated DRB/SRB (i.e., either split PDCP bearer or duplicated PDCP bearer). Each split or duplicated DRB/SRB, or UC bearer in the case of UC configuration, will enter into (or be served by) one RLC stream or entity.

Thus multiple RLC streams (or entities) are provided in some embodiments to support a split or duplicated PDCP bearer in a UC scheme; however, the same DRB identity may be used for each spilt DRB in each of the RLC streams (or entities). The DRB identity should be unique for one application within the scope of the UE to make UC reverse processing possible at a reception end, and this is the case for SRB as well.

As used herein, in some embodiments a UC bearer is defined as one of split/duplicated DRB and split/duplicated SRB, and UC bearer traffic comprises UC bearer attribute(s) and UC bearer(s). As a result, a UC bearer at a transmission and AP formation end (e.g., a network device such as a base station or a remote UE that is to be assisted by relay-based UC) may be part of PDCP (bearer) context (split configuration) or an entire PDCP (bearer) context (duplicated configuration), and the AP may include information on a split or duplication operation on the PDCP bearer. At a reception end (e.g., a remote UE or a network device such as a base station), one or more receptions of such constructed UC bearer traffic from one or more relay UEs, respectively, can restore the original PDCP bearer context with the help of AP information included each UC bearer traffic. Any intermediate relay UEs or helping UEs can make use of the AP information to forward the UC bearer traffic toward the reception end without the need to decipher or determine the context of PDCP or any layers above the PDCP layer.

Issues can arise in current networks for UE relaying functionality. For example, a remote UE and a relay UE can be mobile UEs, and thus channel conditions of either or both of a sidelink (SL) and a Uu link between a base station and a UE can vary over time. This can make relaying functionality unstable or unreliable for a given relaying association between the remote UE and the relay UE. Moreover, due to channel or bandwidth limitations, it can be challenging for a remote UE to support large data rates. For example, a public safety service may require a transmission rate of 12 Mpbs within a limited time window. In some cases such as indoor communications, coverage can also be an issue for a remote UE, and thus using only a single relay link might not be very reliable. For at least certain use cases such as in industrial applications, container applications (e.g., each of the goods in a shipping container having a sensor to communicate each other), health care applications, etc, it may be desirable to support multi-hop relaying with more than one relay UE to forward traffic, in order to extend coverage while avoiding more base station deployments.

Thus, a remote UE may employ more than one relay UE, multi-path connections, or both, to help enhance either or both of data rate and coverage. Moreover, multi-hop relay links may also or instead be used.

The present disclosure addresses several issues to help remote UEs enhance data throughput and/or coverage.

A remote UE can be in-coverage or out-of-coverage, and a remote UE can be referred to as a target UE (TUE) for downlink traffic or a source UE (SUE) for uplink traffic. In the present disclosure, reference is made primarily to uplink and downlink transmission to indicate, respectively, transmission from and to a remote UE. It should be appreciated, however, that sidelink transmissions may also or instead be referred to as upward transmissions from a remote UE or downward transmissions toward a remote UE.

UE cooperation (UC) designs with example protocol architectures are proposed. Such features as the following are among those described in further detail elsewhere herein: UE cooperation mechanisms with UC bearer attributes included in an adaptation protocol; L2-based Uu (i.e., a link or connection between network equipment, such as a base station, and a UE) and sidelink (SL) examples; detailed protocol architecture examples for different UE cooperation scenarios; UE cooperation with relay UEs only, direct (i.e., Uu) and indirect (e.g., Uu and SL) connections, and multi-hop connections, including support for one or more relay UE hops in some embodiments; user plane and control plane designs, including unicast and group cast (broadcast or multi-cast) designs; L2-based UC within SL only, which can be used in a combination with L3-based relaying configuration; and dual connectivity (DC) or carrier aggregation (CA) mechanisms for a remote UE via relaying UEs, where cooperation among network equipment (e.g., multiple cells or base stations) and multiple UEs (e.g., relaying UEs or helping remote UEs) can be achieved.

Some embodiments may support traffic associated with multiple UEs in same UE cooperation message over sidelink communications and/or Uu link communications. In general, UE cooperation bearer traffic can include data from one or more UEs, and UE cooperation may include UE cooperation traffic, relay-only traffic (e.g., relay traffic to an intermediate relay or remote UE without any future UC processing such as aggregation or diversity reception), or a combination of such traffic for one or more UEs.

These and other features are described in further detail herein.

With reference first to FIG. 1, an example communication system 100 in which aspects of the present disclosure are implemented in some embodiments is shown. In general, the system 100 enables multiple wireless or wired elements to communicate data and/or other content. The purpose of the system 100 may be to provide content (e.g., any one or more of voice, data, video, text, referred to collectively herein as "data") via broadcast, unicast, multicast, user device to user device, etc. The system 100 may operate efficiently by sharing communication resources such as bandwidth.

In this example, the communication system 100 includes electronic devices (ED) 110a-110c, Radio Access Networks (RANs) 120a-120b, a core network 130, a Public Switched Telephone Network (PSTN) 140, the Internet 150, and other networks 160. While certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices as, or may be referred to as, a UE, Wireless Transmit/Receive Unit (WTRU), mobile station, mobile subscriber unit, cellular telephone, station (STA), Machine Type Communication device (MTC), Personal Digital Assistant (PDA), smartphone, laptop, computer, touchpad, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the Internet 150, and/or the other networks 160. For example, the base stations 170a-170b may be or include one or more of several well-known devices, such as a Base Transceiver Station (BTS), a Node-B (NodeB), an evolved NodeB (eNodeB), a Home eNodeB, a gNB (next generation NodeB), a Transmission Point (TP), a TRP, a site controller, an Access Point (AP), or a wireless router. Any ED 110a-110c may be alternatively or jointly configured to interface, access, or communicate with any other base station 170a-170b, the internet 150, the core network 130, the PSTN 140, the other networks 160, or any combination of the preceding. Optionally, the system may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality or embodiments described herein. In the embodiment shown in FIG. 1, the base station 170a forms part of the RAN 120a, which may include other base stations, Base Station Controller(s) (BSC), Radio Network Controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b may be configured to operate to transmit and/or receive wireless signals within a particular geographic region or area, sometimes referred to as a coverage area. A cell may be further divided into cell sectors, and a base station 170a-170b may, for example, employ multiple transceivers to provide service to multiple sectors. In some embodiments a base station 170a-170b may be implemented as pico or femto nodes where the radio access technology supports such. In some embodiments, MIMO technology may be employed having multiple transceivers for each coverage area. The number of RANs 120a-120b shown is exemplary only. Any number of RANs may be contemplated when devising the system 100.

The base stations 170a-170b communicate with one or more of the EDs 110a-110c over one or more air interfaces 190 using wireless communication links e.g. RF, µWave, IR, etc. The air interfaces 190 may utilize any suitable radio access technology. For example, the system 100 may implement one or more channel access methods, such as Code Division Multiple Access (CDMA), Time Division Multiple Access (TDMA), Frequency Division Multiple Access (FDMA), Orthogonal FDMA (OFDMA), or Single-Carrier FDMA (SC-FDMA) in the air interfaces 190.

A base station 170a-170b may implement Universal Mobile Telecommunication System (UMTS) Terrestrial Radio Access (UTRA) to establish an air interface 190 using Wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. Understandably, the RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the Internet 150, and the other networks 160). In addition, some or all of the EDs 110a-110c may include functionality for communicating with different wireless networks over different wireless links using different wireless technologies and/or protocols. PSTN 140 may include circuit switched telephone networks for providing Plain Old Telephone Service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such technologies.

It is contemplated that the communication system 100 as illustrated in FIG. 1 may support an NR cell, which also may be referred to as a hyper cell. Each NR cell includes one or more base stations. The base stations of the NR cell may use the same NR cell ID. The NR cell ID is a logical assignment to all physical base stations of the NR cell and may be carried in a broadcast synchronization signal. The NR cell may be dynamically configured. The boundary of the NR cell may be flexible and the system dynamically adds or removes base stations to from the NR cell.

In one embodiment, an NR cell may have one or more base stations within the NR cell transmitting a UE-specific data channel, which serves a UE. The one or more base stations associated with the UE specific data channel are also UE specific and are transparent to the UE. Multiple parallel data channels within a single NR cell may be supported, with each data channel serving a different UE for example.

Direct communications between UEs such as the EDs 110a-110c in FIG. 1 are also possible, and are represented by dashed lines in FIG. 1. UEs communicate with each other over sidelinks to enable UE cooperation and UE relaying in some embodiments, as described in further detail at least below.

One relay link technique that could be used to improve wireless communication network coverage, such as at cell edge or indoors, involves relaying the data of a remote UE through a relay UE. In an uplink operation where data is originated at the remote UE and destined for a network device, the remote UE may be known as an SUE as noted above. Another uplink technique is to improve system throughput by sharing data of an SUE to a Cooperative UE (CUE) on a sidelink between the SUE and the CUE, and then conducting joint transmission in uplink through both the Uu link and the sidelink. An SUE could be helped or assisted by each of these techniques for different scenarios. For example, if an SUE is in a coverage hole and does not have large amount of data to transmit, it could be helped by a relay UE. In another situation, if an SUE has a large amount of data to transmit and it is able to find a nearby CUE, then the SUE could share some data with the CUE on sidelink and both CUE and SUE could conduct joint uplink transmission. Therefore, it may be beneficial to support both types of uplink UE cooperation, and to support adaptation between the two types. A CUE could be configured into different uplink cooperative modes, including a relay mode and a joint transmit mode. Moreover, these two techniques could also be used together to achieve certain goals.

To make UE cooperation (UC) work with the help of one or more relay UEs via one or more data/control paths, a traffic bearer to a remote UE may be split or duplicated at a certain protocol layer such as PDCP, RLC, or Media Access Control (MAC), with a processed (for example, split or duplicated) bearer at transmission and additional information to describe the processed bearer for, e.g., relaying, identification, etc., and with corresponding bearer processing at reception (for example, aggregation, diversity selection, or joint reception in some cases). The additional information for this type of application may be formulated, for example, as a control header or as one or more sub-header(s) that can be located before a processed bearer or processed bearers. This is also referred to herein as an adaptation protocol (AP) for UC, or AP/UC. An AP header or AP sub-header(s) and the processed bearer(s) form UC bearer traffic that is to be relayed via one or more paths by one or more relay UEs, between a remote UE and either another UE or network equipment such as a base station.

In some embodiments of an AP, one or more UC bearer attributes are used, e.g., to identify the bearer(s), indicate relaying target(s), indicate relaying route(s), and point out the bearer(s) processing scheme for relaying and UE cooperation. More generally, UC bearer attributes may be used for any one or more of these purposes, or others instead of or in addition to these examples.

UC bearer attributes are included in UC bearer traffic according to an AP in some embodiments for relaying and UC operations. At a UC start or end location such as a base station or a remote UE, the start location supports splitting or duplicating of a traffic bearer for transmission, while the end location supports the reverse operation(s) of aggregation or diversity reception. In some embodiments, the UC start location also supports channel coding such as a network coding for split or duplicated DRBs from PDCP layer, for example, and the UC end location supports the corresponding channel decoding based on multiple UC bearer messages (from multiple paths) split or duplicated from the same PDCP DRB, for example. An intermediate relay UE or intermediate remote UE in a relay link may perform traffic relaying only, without performing UC processing like a UC start or end location.

Figure 2:
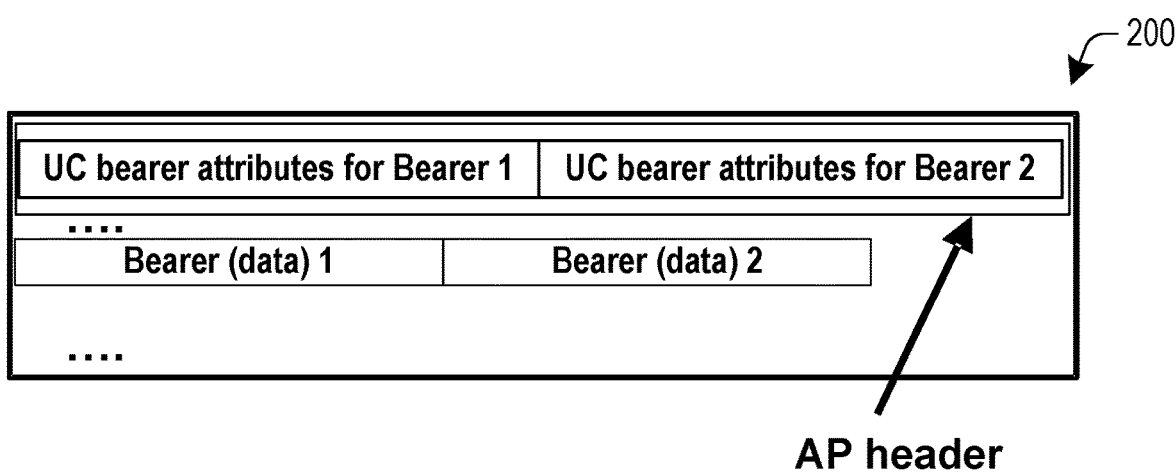
FIG. 2 is a block diagram illustrating an example of UE cooperation (UC) bearer traffic.

UC bearer attributes information can be, for example, in the form of a bearer attribute field or multiple fields in a control header or sub-header(s). FIG. 2 is a block diagram illustrating an example of UC bearer traffic 200, which includes an AP header (including two sub-headers) with information indicative of UC bearer attributes for two bearers, and the two bearers labeled Bearer 1 and Bearer 2.

In general, UC may involve UC bearer traffic with at least one AP header or sub-header and at least one processed (i.e., split or duplicated) bearer from an original traffic bearer such as DRB or SRB. The format for UC bearer traffic or a message shown in FIG. 2 is just an example to implement an AP for UC. In another embodiment, an AP may include one header to indicate how many sub-headers are included.

Given an AP to provide information indicative of one or more bearers in UC bearer traffic (or a UC bearer message), such a formed UC bearer message may include the traffic of any relay UE or other remote UE along a transmission path that helps relay or forward the UC bearer message.

An AP or AP/UC processing point can be applied in any of various architecture layers, including IP, PDCP, RLC, and MAC, for example, with the AP/UC functionality that is similar to the functionality disclosed by way of example herein with reference to particular embodiments.

AP or AP/UC configuration can be: semi-static, using Radio Resource Control (RRC) signaling for example; pre-configured, pre-defined, or dynamic, using Layer 1 (physical or PHY layer) signaling for example; or a combination of these types of configuration.

Illustrative examples of UC bearer attributes include the following, any one or more of which may be used in embodiments: a bearer identity, also referred to herein as a UC bearer identity, such as a number or other identifier; a UC bearer index; one or more destination identifiers; one or more source identifiers; a total number of bearer segmentations allocated to or otherwise associated with a UE; a total number of UC bearer streams processed from the associated PDCP bearer(s) being split or duplicated in the UC bearer, identified by an identity such as an AP generation reference number; an indication as to whether a bearer is a duplicate bearer or multiplexing bearer to one or more other bearers, such as whether the UC bearer includes a split PDCP bearer or a duplicated PDCP bearer generated by a split or multiplexing operation or a duplication operation; an indication of a path or route number or index or other identifier of a relay path or route; an indication of a total number of UC paths or routes for a UE; an indication of a time stamp or adaptation reference of a relaying bearer for use in adaptation point processing; an indication of a time stamp or adaptation reference at each adaptation processing point over relaying an indication as to UC or relay only traffic; and an indication to a control operation. An indication to a control operation may be or include a relaying strategy for example, which may involve conditional relaying, unconditional relaying, one or more bearer drop criteria, etc. In some embodiments, such an indication may specify when to drop UC bearer traffic based on certain criteria, such as a latency limit and/or other conditions.

These are illustrative examples of UC bearer attributes, and other UC bearer attributes may also or instead be used.

Some embodiments herein relate to L2 (PDCP) based UC architectures that support UE relaying, with traffic bearer processing such as splitting or duplicating at the PDCP layer and an additional AP/UC layer (or information) attached to each such processed bearer to form UC bearer traffic. For UC with multiple UE relay paths or routes as shown in FIG. 3A, one embodiment of a corresponding UC protocol stack architecture is shown in FIG. 3B.

Figure 3A:
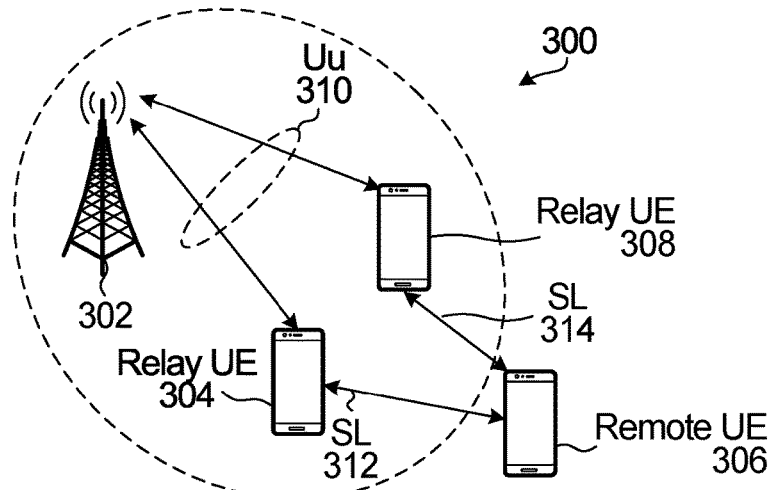
FIG. 3A is a block diagram of an example communication system, illustrating a multiple relay link scenario.
Figure 3B:
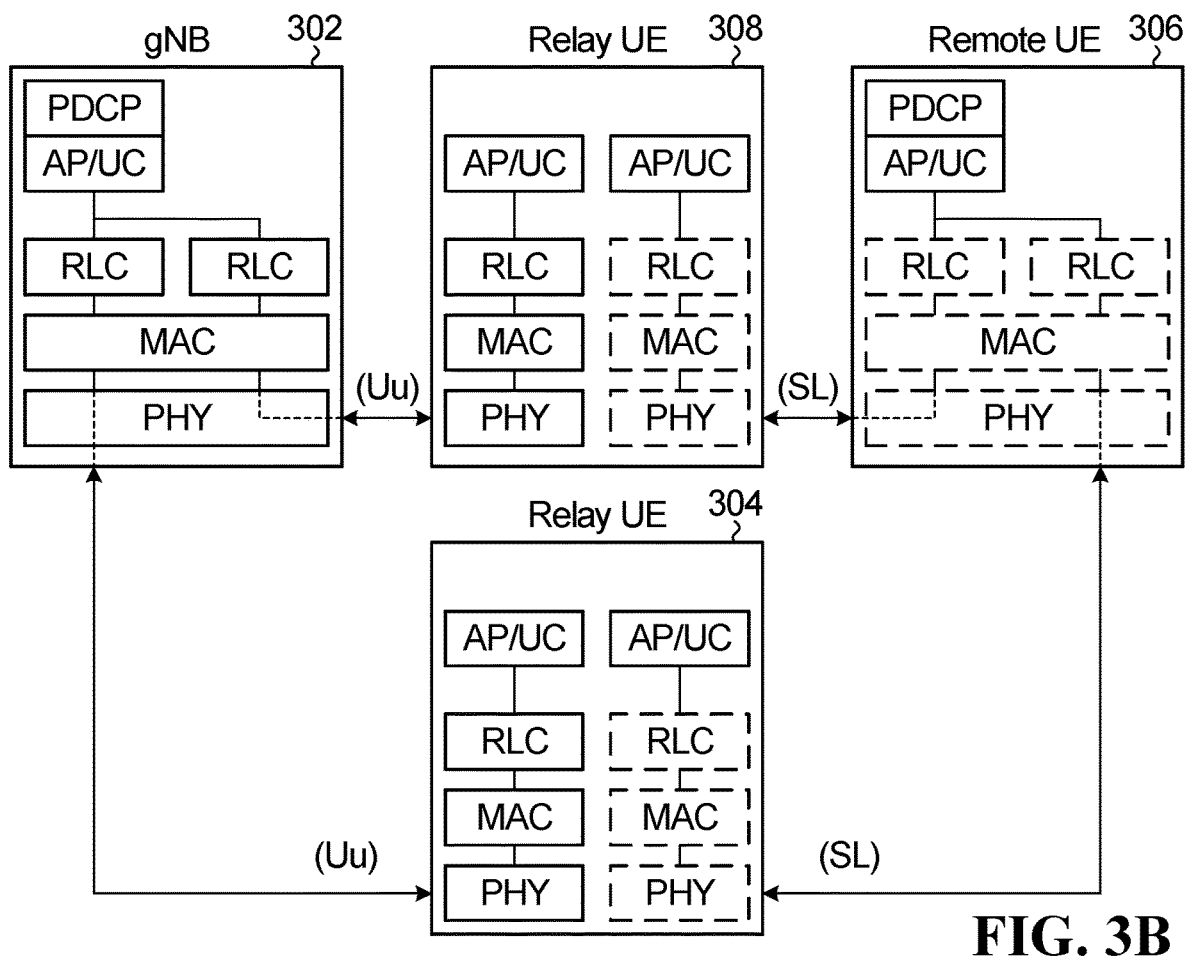
FIGS. 3B, 3C, and 3D are block diagrams illustrating embodiments of UC protocol stack architectures related to the multiple relay link scenario shown in FIG. 3A.

FIG. 3A is a block diagram of an example communication system 300, illustrating multiple relay link scenario. The present disclosure relates in part to multiple relay link applications in which remote UEs are in some way assisted by relay UEs. Although reference is made primarily to "relay UEs" herein, relay UEs may also be referred to as CUEs both here and elsewhere. More generally, a relay UE may be a CUE or another remote UE, also referred to herein as a helping remote UE, that is part of a group of UEs and is configured to assist a remote UE. Relay UE features disclosed herein may be applied to CUEs, helping remote UEs, or other intermediate relaying devices or components in a relay link. In some embodiments, a network node such as a base station can be functioning as a relay node as well by relaying the UC bearer traffic, where the network node may not decipher or know the context of PDCP (and/or any layers above the PDCP layers). Relay links refer to links that involve at least one intermediate component, including at least one relay UE. The relay links enable communications between a communication network and a remote UE, which may or may not be within network coverage.

The example communication system 300 includes network equipment 302 and UEs including relay UEs 304, 308 and a remote UE 306. Communications between the UEs 304, 308 and the network equipment 302 are through an interface shown as "Uu" 310, and sidelink communications directly between each of the relay UEs 304, 308 and the remote UE 306 are through sidelinks 312, 314. Examples of these components and implementation options for communications between these components are provided elsewhere herein. Network equipment 302 may be a network device or equipment such as a base station 170a, 170b in FIG. 1. The UEs may be EDs 110a-c in FIG. 1, for example.

FIG. 3A represents one scenario in which relay UE coordination or cooperation may be useful. In this scenario, the remote UE 306 is "out-of-coverage" (outside of a geographical area of direct communication with network equipment), and the relay UEs 304, 308 are in coverage of the network equipment. There are two relay links, each including a Uu segment between the network equipment 302 and a relay UE 304, 308, and a sidelink segment between each relay UE 304, 308 and the remote UE 306.

In FIG. 3A, traffic that is associated with the remote UE 306 is split or duplicated into more than one path. Two relay links or paths are shown in FIG. 3A, but more generally there may be n paths, with n being greater than or equal to 2, each carrying UC bearer traffic in some embodiments. In FIG. 3A, one path is between the network equipment 302 and the remote UE 306 through the relay UE 308, and another path is between the network equipment 302 and the remote UE 306 through the relay UE 304. These paths may be used for downlink transmission from the network equipment 302 to the remote UE 306, uplink transmission to the network equipment 302 from the remote UE 306, or both.

FIG. 3B illustrates an example of a UC protocol stack architecture to support UC operation. In the example shown, in network equipment 302 such as a gNB, PDCP traffic is split and duplicated via an AP/UC layer into two (or more) RLC streams, each carrying UC bearer traffic. The multiple RLC streams may share the same MAC layer or entity and the same PHY layer or entity, as shown, and can be managed by a single MAC at the network equipment 302. For example, a single MAC may manage such features as any one or more of traffic buffering, traffic path (as pre-configured, semi-statically configured, or dynamically configured) and scheduling. UC bearer traffic in each RLC stream can be transmitted to an individual relay UE such as the relay UE 308 or the relay UE 304 in FIG. 3A by way of unicasting for example, or can be transmitted to multiple relay UEs by way of group-casting such as broadcasting or multi-casting. Communications between the network equipment 302 and relay UEs 308, 304 involve Uu link transmissions, where the protocol stack of RLC, MAC and PHY is based on the Uu link 310 in FIG. 3A. Such an architecture is able to support either or both of downlink transmissions with traffic splitting or duplication at the network equipment 302, and uplink transmissions with aggregation, diversity selection, or joint detection at the network equipment 302.

Each relay UE 308, 304 supports communications with the network equipment 302 over the Uu link 310, and with the remote UE 306 over respective sidelinks 314, 312. Thus, the Uu-based protocol stack of RLC, MAC and PHY will be changed or converted to, also referred to herein as being "adapted" to by an adaptation protocol in some embodiments, a sidelink-based protocol stack for RLC, MAC and PHY. The sidelink-based protocol stack for RLC, MAC and PHY is shown in dashed lines in each relay UE 308, 304 in FIG. 3B. Each relay UE 308, 304 in this case is purely to forward UC bearer traffic along the relay path or route, which can be pre-configured, semi-statically configured, or dynamically configured.

A bearer in the PDCP layer, above the AP/UC layer in FIG. 3B, has the same content in the network equipment 302 and the remote UE 306. Although the relay UEs 308, 304 may potentially support PDCP processing in some embodiments when not operating as relay UEs (for example, when its own traffic arrives), for L2 relay UE operation the relay UEs 308 and 304 will not decode or process any PDCP context in their relaying processing in the example shown in FIG. 3B. For example, for downlink traffic relaying, the relay UEs 308 and 304 only decode from the Uu link 310 PHY, MAC, RLC layer up to AP/UC layer (or information) and convert to the AP/UC information, RLC, MAC and PHY for the SL 314 and 312, respectively, where the context of PDCP and above layers from the Uu link is not processed by the relay UEs 308 and 304, which pass them over to the SL links.

Each relay UE or other intermediate relaying device such as a helping remote UE relays UC bearer traffic towards the remote UE for downlink relaying. Relaying by a relay UE or other intermediate relaying device involves at least PHY layer, MAC layer, and RLC layer processing such as decoding, up to the AP/UC layer, and forwarding the UC bearer traffic. In the example shown, each relay UE receives UC bearer traffic over a first air interface, applies PHY layer, MAC layer, and RLC layer processing such as decoding, up to the AP/UC layer, for the first air interface, then applies AP/UC layer, RLC layer, MAC layer, and PHY layer processing such as encoding for a second air interface. FIG. 5B illustrates that UC bearer traffic may be forwarded or transmitted over or through different air interfaces, and such embodiments may involve air interface conversion in terms of its contexts in, e. g., PHY, MAC and RLC layers for the example shown. Air interfaces may be of different types, including an access air interface such as a Uu link for NR or a Uu link for LTE, a sidelink (or PC5) interface, a WiFi interface, a backhaul interface, an air interface for a non-terrestrial link, other non-3GPP air interfaces, etc.

These details and examples regarding relaying and processing by relay UEs and other intermediate relay devices may also apply to other embodiments herein.

In the relay UE 308 for downward transmission over the sidelink 314 to the remote UE 306, forwarded UC bearer traffic is received by the remote UE via the sidelink, and after signal detection and decoding by the PHY layer or entity at the remote UE, the MAC layer or entity at the remote UE is able to separate the received traffic (from the PHY layer or entity) into different RLC streams. At the AP processing point, shown as the AP/UC layer in FIG. 3B, the remote UE 306 is able to either aggregate the multiple RLC streams into one original PDCP bearer (or multiple original PDCP bearers), or perform diversity selection or joint detection to obtain the original PDCP bearer(s) from the network equipment 302 based on split or duplication operation details provided in the AP. In the opposite direction, from the remote UE 306 to a relay UE 308, 304 for upward transmission, the PDCP bearer (or the PDCP context including PDCP bearers) is split or duplicated via the AP/UC layer (storing the splitting/duplication operation details for the end-point reception end to do reverse operation) to form multiple UC bearers on multiple RLC streams, with each stream carrying one UC bearer traffic (UC bearer plus its associated set of attributes, in an AP header for example), and then each RLC stream proceeds through one MAC and one PHY to send the traffic out over the sidelinks 314, 312. UC bearer traffic in one RLC stream can be sent to an individual relay UE 308, 304 by way of unicasting along a transmission path or can be sent to multiple UEs (including the other relay UEs in a UC group) by way of group-casting, either broadcasting or multi-casting for example. Unicasting along a single transmission path or group-casting can be pre-configured, semi-statically configured, or dynamically configured.

In some embodiments, each of multiple UC bearers may include the same (if duplication is applied to generate the UC bearers) or different (if splitting or multiplexing is applied to generate the UC bearers) data information. UC bearer attributes, in an AP header for example, associated with the UC bearer in each UC bearer traffic may include at least a destination ID (e.g., remote UE ID, TUE ID or TUE addressing in the UC group in the case of downlink relaying) and operation details (e.g., whether multiplexing or duplication was applied to generate the UC bearer). For a splitting or multiplexing operation, additional information such as an identity of the split bearer, or a split bearer index may also be included in the UC bearer attributes. Illustrative examples of UC bearer attributes are provided elsewhere herein. As a result, UC bearer attributes among multiple streams of UC bearer traffic relayed via different paths may or may not be same, depending on the UC operation type (e.g. splitting, duplication) and other configuration attributes. UC bearer attributes are attached to or otherwise included with the UC bearer as part of the UC bearer traffic, and accordingly the associated AP may be considered as an additional "layer" locating between PDCP and RLC layers in a protocol stack.

FIG. 3B can support both a user data plane and a control plane. Traffic for a control plane may include any one or more of: paging messages, higher-layer signaling such as RRC, relaying configuration signaling, and UC configuration signaling.

The architecture shown in FIG. 3B is an example that may be applied to other scenarios as well. Before considering other possible architectures such as those illustrated in FIGS. 3C and 3D, application of the example architecture in FIG. 3B to other connection scenarios are described below.

Figure 4A:
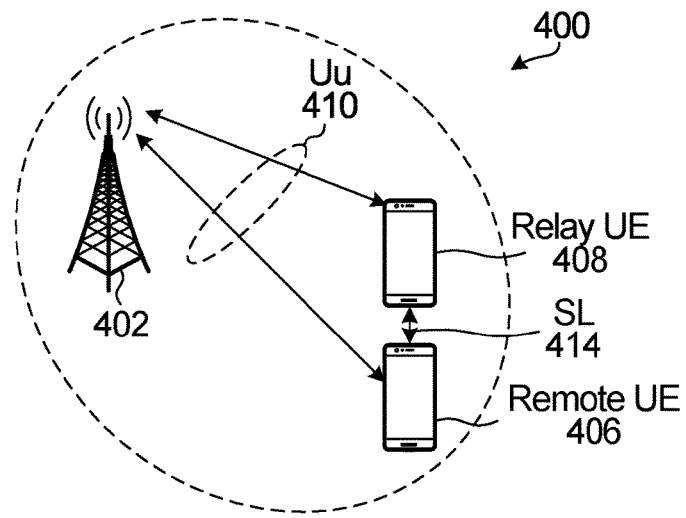
FIG. 4A is a block diagram of another example communication system, illustrating a mixed direct link and relay link scenario.
Figure 4B:
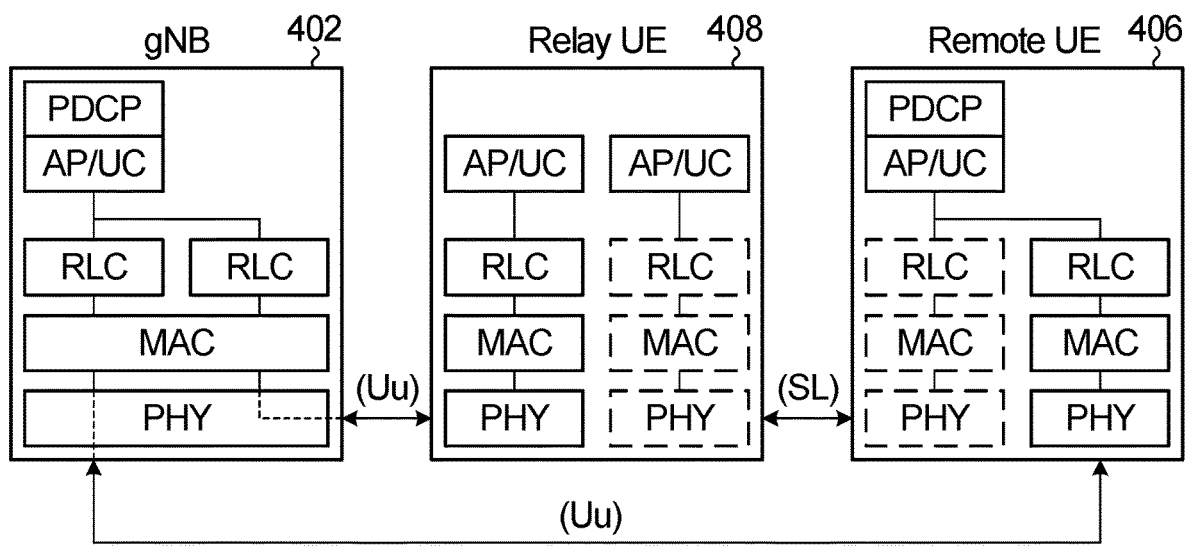
FIGS. 4B, 4C, and 4D are block diagrams illustrating embodiments of UC protocol stack architectures related to the scenario shown in FIG. 4A.

FIG. 4A is a block diagram of another example communication system illustrating a mixed direct link and relay link scenario, and FIG. 4B is a block diagram illustrating an embodiment of a UC protocol stack architecture related to the scenario shown in FIG. 4A. In the example 400 in FIG. 4A, the difference from the example 300 in FIG. 3A is that the remote UE 406 is in-coverage in FIG. 4A. However, there are still two links in the example 400, including one direct Uu link 410 between the network equipment 402 and the remote UE 406, and one relay link including a Uu segment between the network equipment 402 and the relay UE 408 and a sidelink segment between the relay UE 408 and the remote UE 406 through the sidelink 414.

In FIG. 4A, traffic associated with the remote UE 406 is split or duplicated into more than one path, each carrying UC bearer traffic in some embodiments. The paths between the network equipment 402 and the remote UE 406 in the example 400 include an indirect connection through the relay UE 408 and a direct Uu path between the network equipment and the remote UE. These paths may be used for transmission from the network equipment 402 to the remote UE 406, uplink transmission to the network equipment 402 from the remote UE 406, or both.

FIG. 4B is an example of a UC protocol stack architecture to support direct and indirect connections such as in the example scenario in FIG. 4A. To compare with FIG. 3B, network equipment 402 such as a gNB in FIG. 4B is directly connected to the remote UE 406 via a Uu link as noted above. The UC protocol stack in the remote UE 406 is designed and configured accordingly, which means the remote UE has a Uu based protocol stack of RLC, MAC and PHY to communicate with the network equipment over the Uu link. This is shown in FIG. 4B, in which the remote UE 406 has two sets of UC protocol stacks of RLC, MAC and PHY, including one set for sidelink and the other for Uu link. All other parts including configuration and signaling schemes could be same for FIGS. 4A and 4B as for FIGS. 3A and 3B.

Figure 5A:
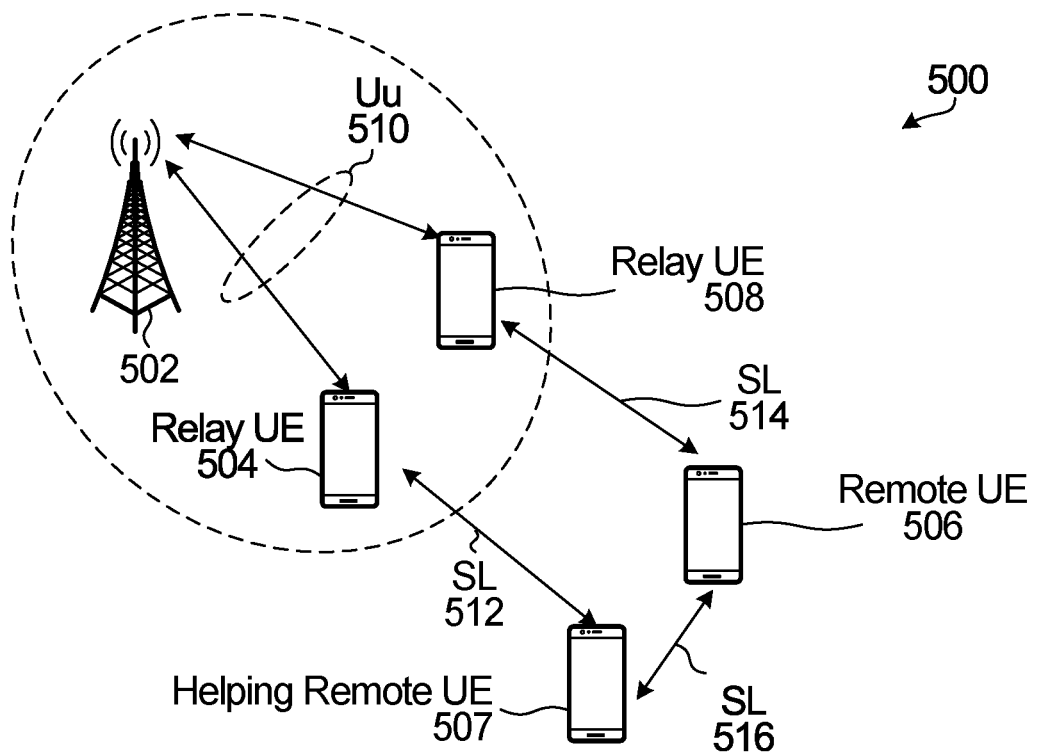
FIG. 5A is a block diagram of a further example communication system illustrating a multi-hop relay link scenario.
Figure 5B:
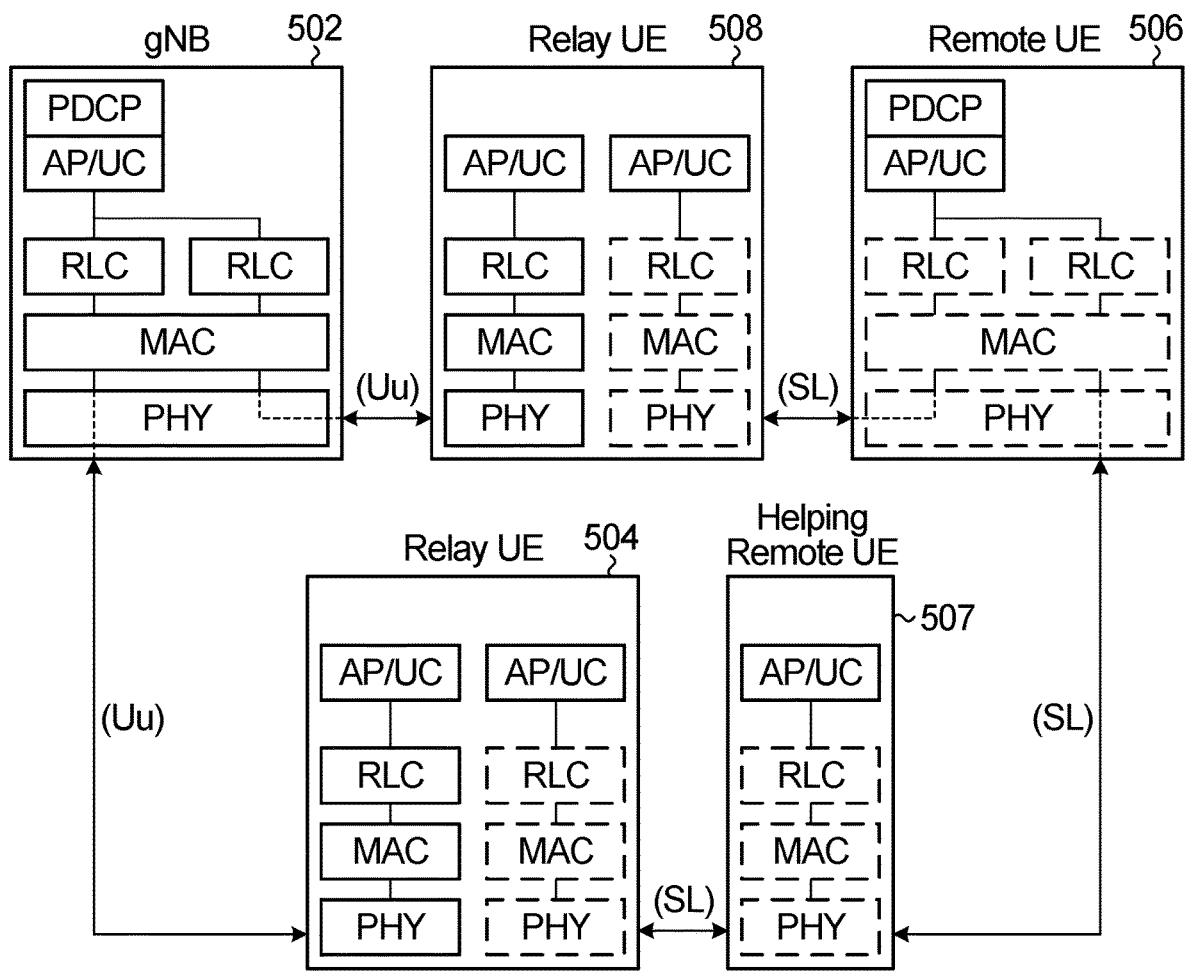
FIGS. 5B, 5C, and 5D are block diagrams illustrating embodiments of UC protocol stack architectures related to the scenario shown in FIG. 5A.

Continuing with the L2 PDCP based UC architecture example, FIG. 5A is a block diagram of a further example communication system illustrating a multi-hop relay link scenario, and FIG. 5B is a block diagram illustrating an embodiment of a UC protocol stack architecture related to the scenario shown in FIG. 5A.

The example communication system 500 illustrates a multiple relay link scenario similar to FIG. 3A but with addition of a helping remote UE 507, with sidelinks 512, 516. In FIG. 5A, traffic associated with the remote UE 506 is split or duplicated into more than one path, each of which carries UC bearer traffic in some embodiments. One path between the network equipment 502 and the remote UE 506 is through a Uu segment or link at 510 via a relay UE 504, the helping remote UE 507, and the sidelinks 512, 516. This path is an example of a multi-hop path or link through multiple UEs 504, 507. Another path between the network equipment 502 and the remote UE 506 is through a Uu link at 510 and via a relay UE 508 and sidelink 514. As in other embodiments, these paths may be used for transmissions from the network equipment 502 to the remote UE 506 and/or for transmissions to the network equipment 502 from the remote UE 506.

FIG. 5B is an example of a UC protocol stack architecture to support multi-hop relay links. The difference between FIG. 5B and FIG. 3B is that there is additional intermediate helping remote UE 507 as a relaying UE in FIG. 5B, with the remote UE 506 connected to the helping remote UE 507 and to the relay UE 508 over respective sidelinks. The remote UE 507, as an intermediate relaying UE, could be configured with one set of sidelink-based UE protocol stack layers or entities for RLC, MAC and PHY for UC operation.

It should be noted that only one RLC layer or entity is provided for the helping remote UE 507 in the example shown in FIG. 5B, to indicate that in this case, the helping remote UE 507 is not configured to be assisted by other UEs with multiple paths. In another embodiment, the UC protocol stack for the helping remote UE 507 can be configured similarly to the remote UE 506, to support UC relaying functionality and potentially simplify configuration and implementation. The UC protocol stack of the helping remote UE 507 may also or instead be configured similarly to the remote UE 506 if the helping remote UE 507 needs transmission help from other UEs by UC operation. All other parts including configuration and signaling schemes could be the same for FIGS. 5A and 5B as for FIGS. 3A and 3B.

L2 PDCP based UC architecture represents one embodiment. One potential benefit is improved multiple relay UE diversity, in that the same data could be transmitted on multiple links to a remote UE or network equipment, and thus provide multi-link gain. Another potential benefit is improved throughput and coverage, in that data could be split and transmitted on multiple links to the remote UE or network equipment, and aggregated at the destination to improve overall throughput relative to single-link transmission.

Figure 3C:
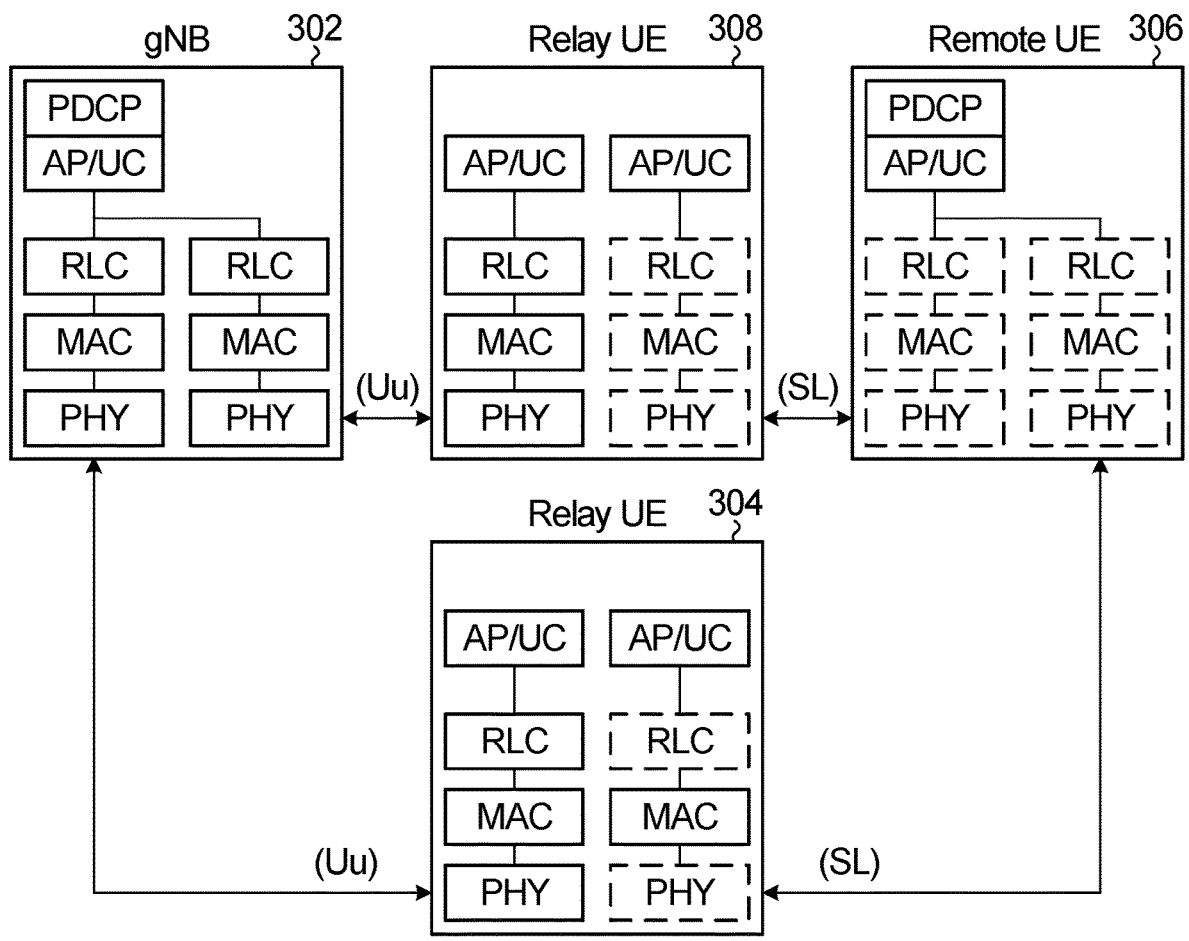
Figure 4C:
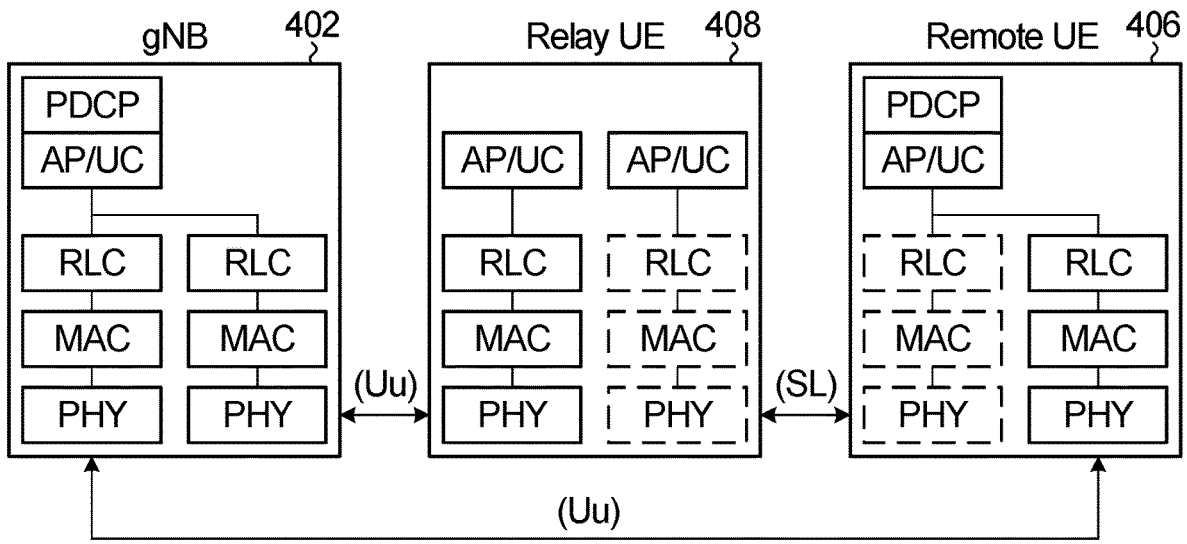
Figure 5C:
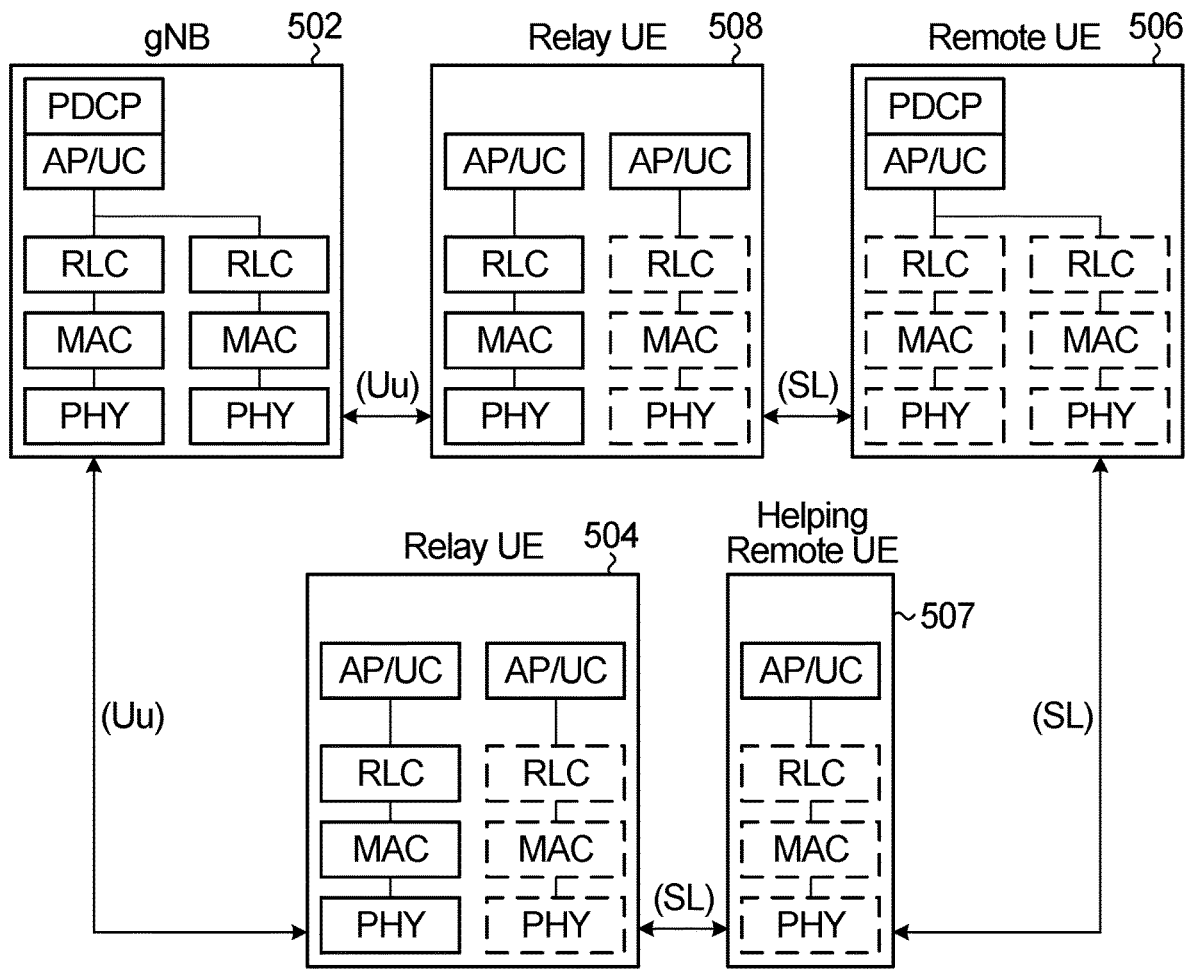

According to another embodiment, after the PDCP bearer is split into more than one bearer to form multiple RLC streams, each stream is served by an individual MAC layer or entity and an individual PHY layer or entity, and thus multiple sets of parallel UC protocol stacks of RLC, MAC and PHY layers or entities are configured. Examples of this, related to the scenarios shown in FIGS. 3A, 4A, and 5A, are shown in FIGS. 3C, 4C, and 5C, respectively.

Embodiments referenced above in the context of FIGS. 3B, 4B, and 5B can be applied to both UE data plane and control plane, and unicasting and/or group-casting can be configured. A further embodiment supports a UC control plane protocol architecture by group-cast. For example, in a UC protocol stack architecture for UE control plane, control messages such as one or more of paging messages from a network or RAN, system signaling for synchronization and initial access, and higher layer configuration signaling such as RRC configuration signaling, can be transmitted via UE relaying to one or more desired UEs. Such control messages are from network equipment in an embodiment, in which case they primarily involve downlink signaling. Examples include a paging message to be transmitted to a remote UE such as 306, 406, 506, and RRC configuration signaling to be transmitted to a remote UE. As a result, a main difference between UC control plane group-cast embodiments and embodiments described above with reference to FIGS. 3B, 4B, and 5B is a modification of a UC protocol stack for network equipment.

In some UC control plane group-cast embodiments, a control message (or an SRB) is not split or duplicated into multiple RLC streams. A control message in a PDCP bearer may then be processed by an AP/UC layer to form one RLC stream, and thus one MAC entity and one PHY entity can be employed. The control message(s) can be transmitted via group-casting, by broadcasting or multi-casting for UC operation for example, where UC operation parameters such as message transmission scheme(s) can be pre-configured, semi-statically configured (such as through RRC signaling) or dynamically configured.

Figure 3D:
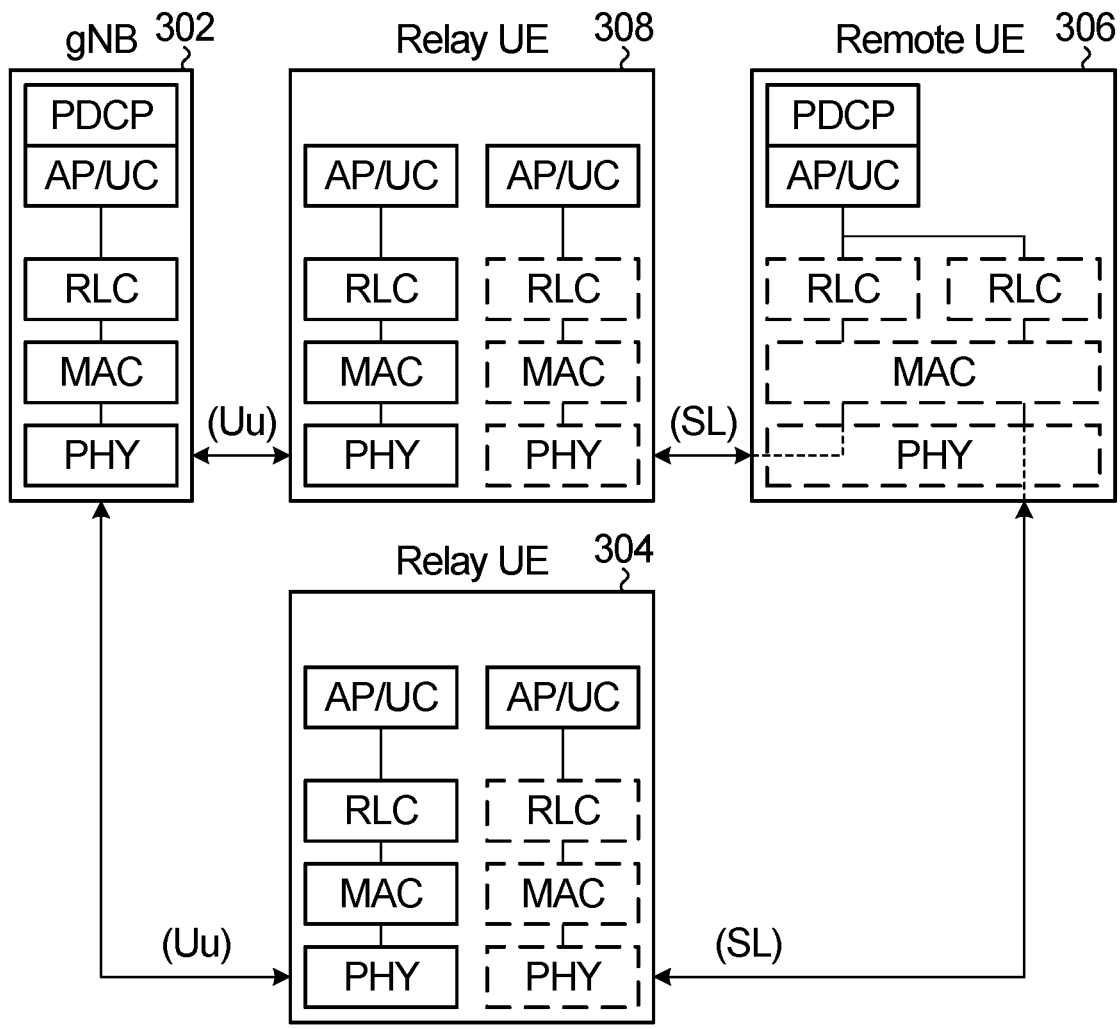
Figure 4D:
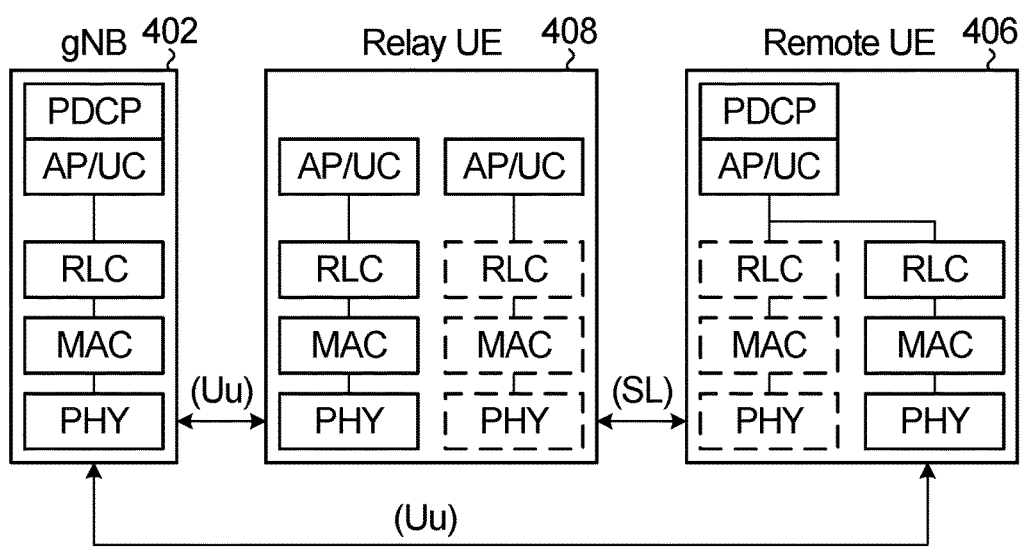
Figure 5D:
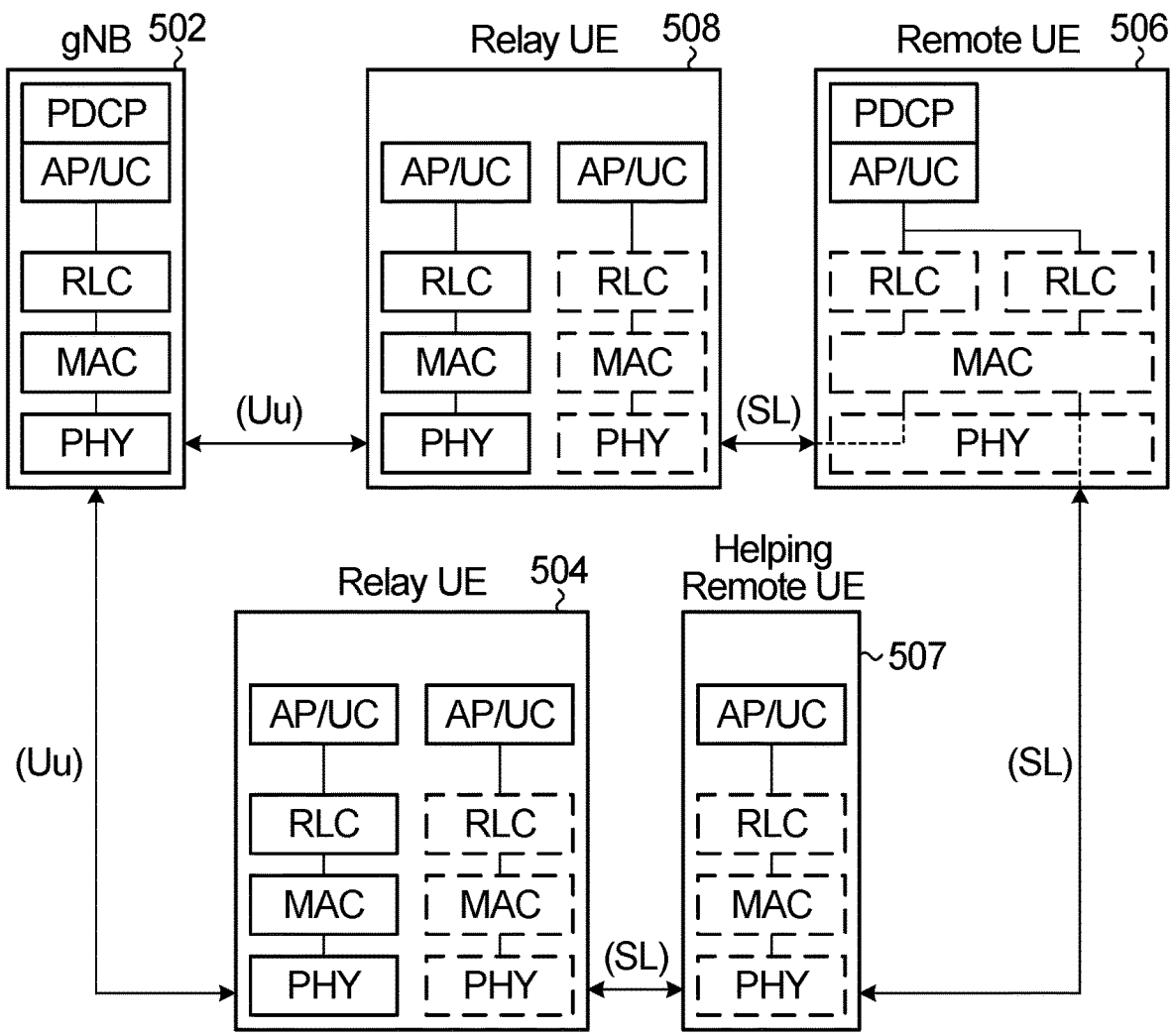

Examples related to the scenarios shown in FIGS. 3A, 4A, and 5A are shown in FIGS. 3D, 4D, and 5D, respectively.

In comparison of FIGS. 3C and 3D with FIG. 3B where the protocol stack architecture difference in FIG. 3C is that each RLC stream (or entity) is served by a separate MAC entity and separate MAC entity, the protocol stack architecture in FIG. 3C can be applied to UC with different radio access technologies or interfaces, e.g., two split bearers may enter into two RLC entities with LTE and NR, respectively, or with Uu and SL, respectively. The protocol stack architecture difference in FIG. 3D is that the network device (or gNB) has no bearer split or duplication operation and only attaches AP information to a PDCP packet data unit (PDU) or PDCP bearer (or bearer segment) for UC and relaying, and the architecture in FIG. 3D can be applied to, e.g., transmission of control messages, system control signaling, etc., for one or more UEs. These statements are true for FIGS. 4C and 4D versus FIG. 4B, and for FIGS. 5C and 5D versus FIG. 5B.

Another embodiment involves L2 (PDCP) adaptation processing in a relay UE. L2 UC operation is done in sidelink, and adaptation processing ends in a relay UE instead of in network equipment such as a base station. Such a relay UE can be considered a master relay UE or special relay UE that is pre-configured or configured (semi-statistically or dynamically). A master relay UE may perform at least part of sidelink-related network equipment functionality such as control and scheduling for other UEs in sidelink in some embodiments.

Figure 6A:
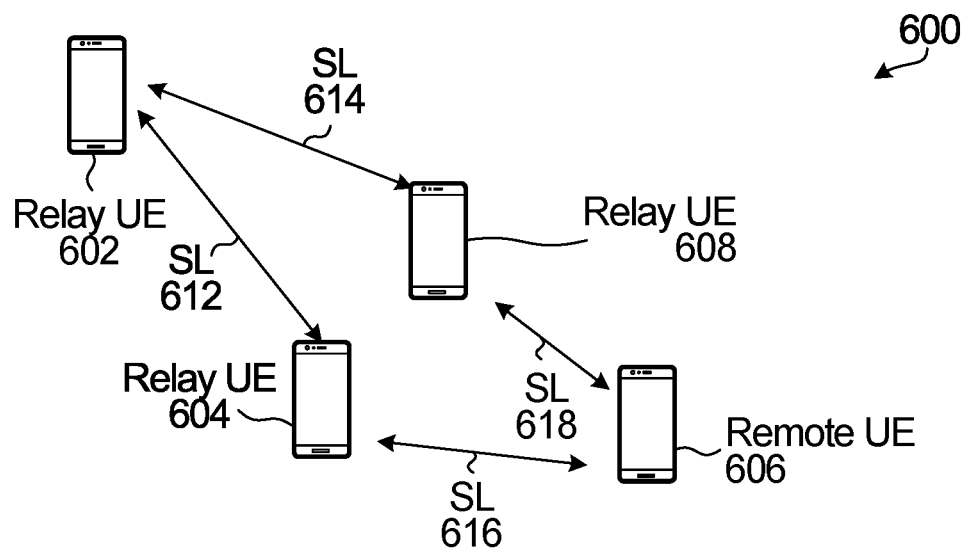
FIG. 6A is a block diagram of another example communication system.

Consider FIG. 6A, which is a block diagram of another example communication system. The example 600 is similar to the example 300 in FIG. 3A, but includes a relay UE 602 that has sidelinks 612, 614 with two relay UEs 604, 608, instead of network equipment and Uu links. Two relay links are provided for the remote UE 606 in this example, over the sidelinks 612, 616 through the relay UE 604 and over the sidelinks 614, 618 through the relay UE 608.

The relay UE 602 in the example 600 is configured as a master relay UE or special relay UE. As noted above, compared with the example 300 in FIG. 3A, in the example 600 the network equipment 300 with Uu links is replaced by the relay UE 602 with sidelinks 612, 614, and the relay UE 602 can support at least some functionality that is described herein with reference to network equipment.

Figure 6B:
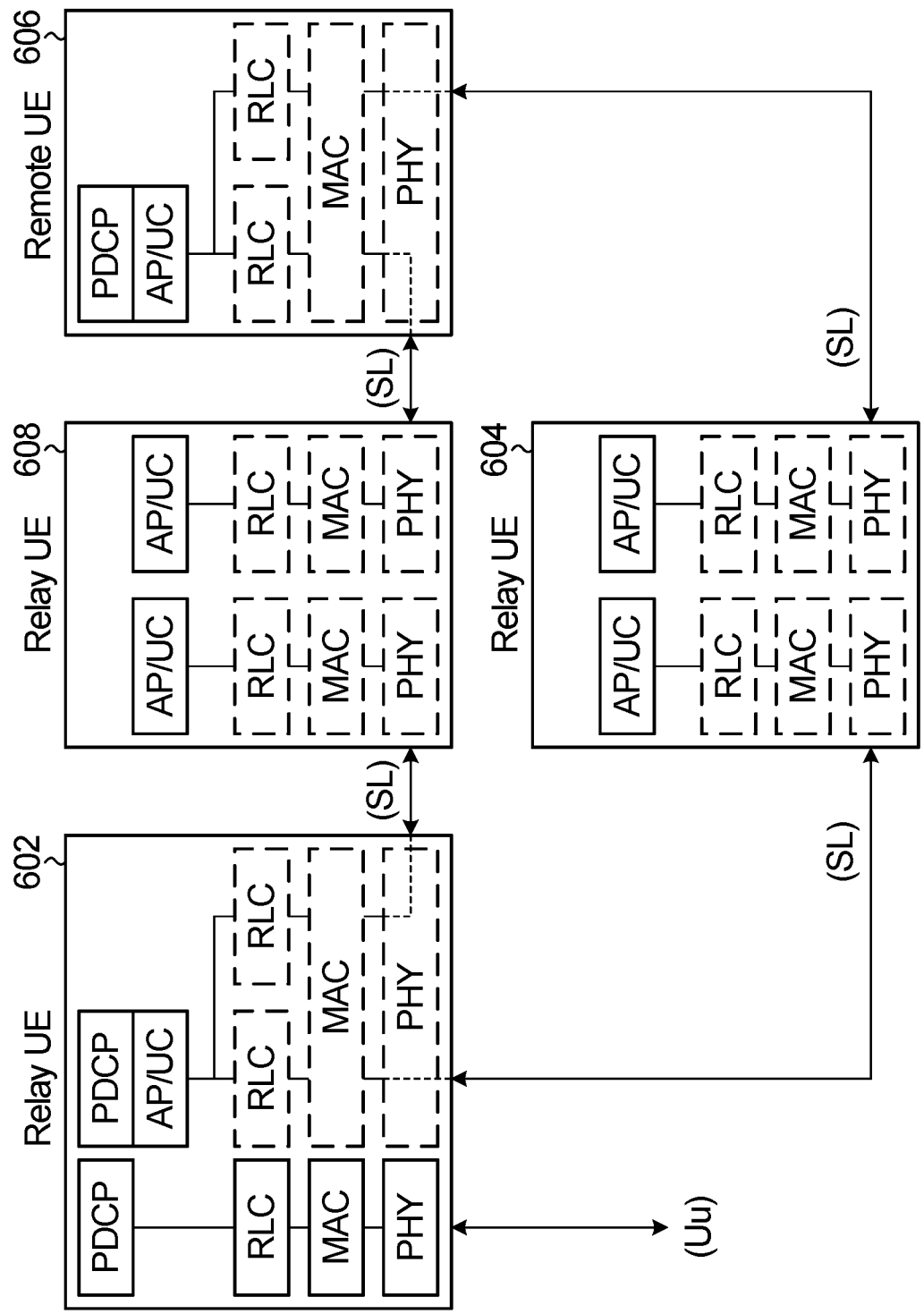
FIG. 6B is a block diagram illustrating an embodiment of a UC protocol stack architecture related to the system shown in FIG. 6A.

An embodiment of a UC protocol stack architecture related to the system in FIG. 6A is shown in FIG. 6B, in which relay UE 602 supports L2 UC adaptation processing, such as PDCP bearer splitting or duplication for transmissions toward the remote UE 606, or aggregation, diversity selection, or joint detection for transmissions from the remote UE 606. The relay UE 602 ends UC adaptation processing in sidelink, which means that all sidelink UC bearer traffic will be processed at the relay UE 602 and in some embodiments the relay UE may still support a normal PDCP bearer for a Uu link and Uu transmission to or reception from network equipment such as a base station (not shown). In the embodiment shown in FIG. 6B, only sidelink UC operation is performed among UE-to-UE relays.

Such a UC protocol stack architecture as shown in FIG. 6B for relay UE 602 and for other UEs is able to operate independently from other components of a communication network. It is also feasible for the relay UE 602 to operate simultaneously with L3 relaying (in the IP layer) configuration as long as the relay UE 602 has a capability or configuration for both L2 relay and L3 relay functionalities. Although L3 based relayed traffic to remote UE 606 is transparent to network equipment such as a base station, the relay UE 602 may be aware of the L3 based relayed traffic to the remote UE 606, and thus the relay UE 602 can apply L2 based sidelink UC operation to communicate with the remote UE 606 via intermediate relay UEs such as the relay UEs 604, 608.

It should also be noted that a UC protocol stack architecture as shown in FIG. 6B may be applied in other embodiments. For example, FIG. 6B is similar to FIG. 3B, but other stack architectures disclosed herein, including those in any of FIGS. 3C, 3D, 4B to 4D, and 5B to 5D may be modified to support sidelink-only UC operation.

The stack architecture examples in any of these drawings may be modified by replacing the network equipment stack with the stack of the relay UE 602 shown in FIG. 6B. For example, a master relay UE with an SL protocol stack architecture can replace the network equipment (or gNB) in FIG. 3C to connect to other UEs and support SL-only UC.

Embodiments disclosed herein may involve any of various behaviors or provide support for any of various functions at one or more of: a core network, wireless network equipment such as one or more base stations, and one or more UEs.

Consider a core network, for example. For L2 based UC, UC traffic may be transparent to the core network (CN). In the case of L3 relaying, L2 based UC that is applied to a layer lower than IP is operational. If AP/UC is applied to L3, i.e., IP layer in CN, CN with UC can perform traffic splitting or duplication for transmission, and traffic aggregation or selective detection for reception.

In some embodiments, L3 relay based UC schemes can be considered. Possible motivations include:
  1) A remote UE with a single L3 based relay UE might not be very reliable, especially when both a relay UE and a remote UE may move around; and it is expected that a little movement with certain direction or angle change can dramatically change the channel (SL) conditions between the relay UE and the remote UE. Thus, a remote UE may be better able to connect with more than one L3 relay UE for help.
  2) A remote UE can move around such that its channel conditions with a base station or other network equipment can improve, thus making direct communications with the base station or other network equipment also available, but it may still be desirable for the remote UE to keep the relay UE's help; and such a situation may be considered to enhance the remote UE performance in some use cases such as real time video surveillance and interaction.

As a result, possible solutions to L3 relay based UC may include at least the following three solutions, referred to as solution 1, solution 2, and solution 3.

Solution 1: one remote UE can be configured with more than one L3 relay UE where each L3 relay UE will provide relaying help to the remote UE by configuring associated parameters (e.g., remote UE addressing) and report to network equipment on the relaying group configuration. The network equipment may configure IP layer information such as the relay UE IP address and remote UE port number for more than one relaying group associated with same remote UE, such that the network equipment is able to deal with transmissions of multiple paths to or from one remote UE via more than one relay UE. Multiple path transmissions may include duplication packets or multiplexing packets, for example. One remote UE will have more than one path to connect with the network equipment, and there are two operation modes in some embodiments. According to an operation mode 1: The remote UE is configurable to switch service under certain conditions and switching criteria such as channel quality measurement(s) and/or channel quality threshold(s) between more than one relay UE, where a switching notification or request to the network equipment can done by both remote UE and one relay UE (either currently served relay UE or to be served relay UE). According to an operation mode 2: The remote UE is configured to be served by more than one relay (i.e., more than one relay UE is activated or active to help the remote UE). For UL, the remote UE may transmit independent packets or duplicated packets to the network equipment via one or more L3 relay UEs; for DL, the remote UE may be able to receive duplicated or multiplexed packets that are transmitted towards it.

Solution 2: one remote UE can be configured with one L3 relay UE while it is also allowed to configure a direct link (independently) with the (core) network (e.g., with its own IP address in the network). Thus, there are two connections or paths for transmissions and receptions between the network and the remote UE, and by configuring or activating the two paths (one is via a relay UE and the other is a direct connection with the core network), either duplicated or multiplexed packets can be transmitted; or alternatively, the two paths can be configured or activated with one (more reliable) path as active.

Solution 3: a remote UE can be configured with a combination of Solution 1 (multiple) connections and direct connection with a network.

In some embodiments of the above solutions, UC AP adaptation functionality can be configured by additional splitting or duplication parameters in the L3/IP layer or a higher layer e.g., Multipath Transmission Control Protocol (MPTCP) layer, Application (APP) layer. For the L3/IP layer, these AP parameters for UC can be defined using one or more L3 fields such as IP reserved/unused field(s), for example.

Wireless communication network equipment such as a base station or a gNB can perform splitting/duplication or aggregation/diversity detection functionality of UC in some embodiments. Multiple paths can be for multiplexing or duplication of UE traffic. Multiplexing or duplication can be configured semi-statically, configured dynamically, pre-configured, pre-defined, or managed according to a combination of these approaches. UC bearer attributes support UC traffic and/or relay-only traffic for one or more UEs in some embodiments. In the case of L3 relaying, wireless network equipment such as a base station or gNB may still apply L2 based UC operating at a RAN side, for example.

An intermediate relay UE or helping remote UE may just relay UC bearer traffic, with the following possible exceptions in some embodiments: decoding and/or otherwise processing an adaptation header to determine the forwarding destination(s) in a message; and if UC bearer traffic also includes partial traffic for the intermediate relay UE or the helping remote UE, then do the following: reconstruct the UC message by removing any associated sub-header(s) and the UE's own traffic from the UC bearer traffic. In some embodiments, each of multiple relaying paths is configured separately as a relaying group, thus each intermediate relay UE or helping remote UE may have knowledge of all UE IDs or UE address IDs associated with the path and a forwarding direction to any UE in the relaying path. As a result, for multi-hop relaying (e.g., more than one UE to relay traffic) scenarios, it may be sufficient for an AP to include only a source ID and/or a destination ID instead of all UE addresses or IDs for all UEs along a path. It may be feasible, as for SL transmissions, for each UE to be configured with a UE destination ID or a group destination ID in a relaying group, and these source and destination IDs (all the IDs or part of them) can be carried in MAC header or sub-header(s). Thus, because an intermediate relay UE or helping remote UE knows by configuration a forwarding direction (to another intermediate relay UE or helping remote UE) toward the remote UE, it may be sufficient for an AP to include only a source ID (e.g., UC start location) and/or a destination ID (e.g., UC end location) of the traffic. Moreover, if traffic forwarding is done via only one relay UE or helping remote UE (e.g., a relay UE to connect a base station in Uu and a remote UE in SL), then the AP may have an option to include no source ID and destination ID of the traffic, because by configuration the relay UE or helping remote UE has knowledge of the source and destination of the traffic. In this case, one option for the AP is to include only UC related information in UE bearer traffic such as duplication or splitting, where the splitting may be based on packet length, e.g., using a threshold to determine whether or not bearer splitting is to be applied.

A remote UE that is a destination UE or a source UE, or a master relay UE, may support data aggregation or splitting functionality of UC, including diversity or multiplexing receiving traffic from and sending traffic to another UE or network equipment. In one embodiment, a relay UE may take a role, or at least a partial role, of network equipment such as a base station or gNB, for example, when L3 relaying is used in a system where remote UE traffic is transparent to the network equipment.

Regarding configuration, any of these or other relay behaviors or features, UE behaviors or features, or network equipment behaviors or features can be preconfigured, pre-defined, or dynamically configured or semi-statically configured using one or more of DCI, RRC, SCI, multi-cast signaling, or broadcast signaling.

Behaviors of various components and features that may be provided in some embodiments are also considered in further detail below.

Figure 7:
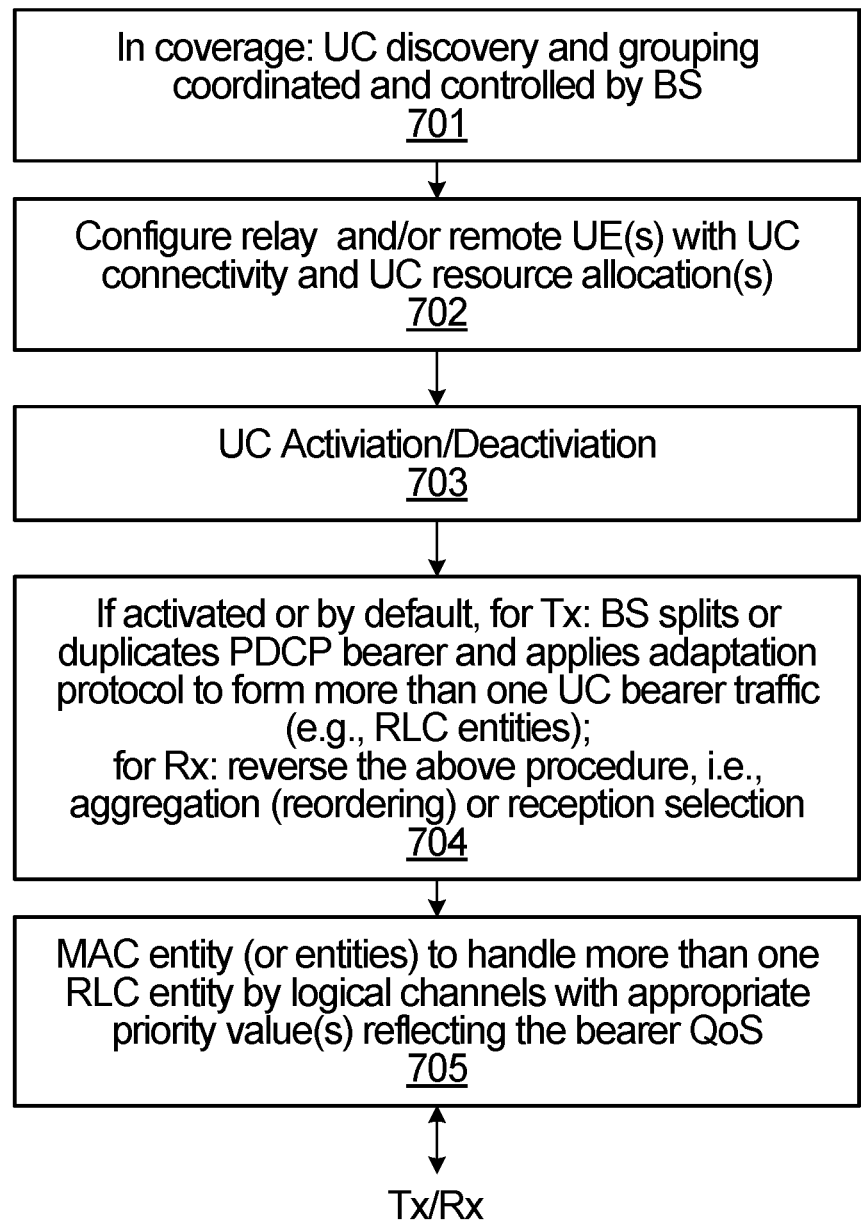
FIG. 7 is a flow chart illustrating example network equipment procedures for UE cooperation among in-coverage UEs.

FIG. 7 is a flow chart illustrating example network equipment procedures for UE cooperation among in-coverage UEs. At 701, it is assumed that all relay UEs and remote UEs are in coverage, and that UC grouping based Uu and SL measurements and reports are controlled by network equipment, indicated in FIG. 7 as a base station (BS) as an example. 701 is illustrative of an operation that may involve communicating signaling to enable relay-based UC by a group of UEs, by transmitting such signaling to UEs in the network equipment example shown.

At 702, the BS configures one or more UEs in the UC grouping with desired connectivity, for example via multiple relay UEs only, via direct and indirect connections, with multiple-hop relays, or any combination of these, and with resource allocation(s) for UC transmissions and receptions. Signaling can be semi-static or dynamic. This is illustrative of an operation that may involve communicating a configuration, by transmitting the configuration to UEs in this example.

UC can be operational after configuration, or it can be explicitly activated after configuration. Explicit activation is shown at 703, but can be optional. UC may be deactivated where no PDCP splitting and no UC adaptation protocol is to be applied, for example. This can be signaled by one or more of: MAC CE, RRC, DCI, and SCI.

704 illustrates PDCP bearer splitting/duplication or aggregation (or reordering, which is a kind of aggregation to restore split bearers back in order into one original bearer)/ diversity selection (or joint detection if network coding is applied) depending on whether a transmit (Tx) or receive (Rx) operation is being performed.

705 illustrates one or more MAC entities handling multiple RLC streams or entities, including one for each UC bearer traffic. One or more parameters including any of bearer priority, a reliability requirement, or a desired or required QoS, may impact UC bearer traffic handling, and may be reflected in a MAC logical channel with a logical group ID for example.

Transmission (Tx) and reception (Rx) of UC bearer traffic are shown generally as Tx/Rx, below 705 in FIG. 7.

Figure 8:
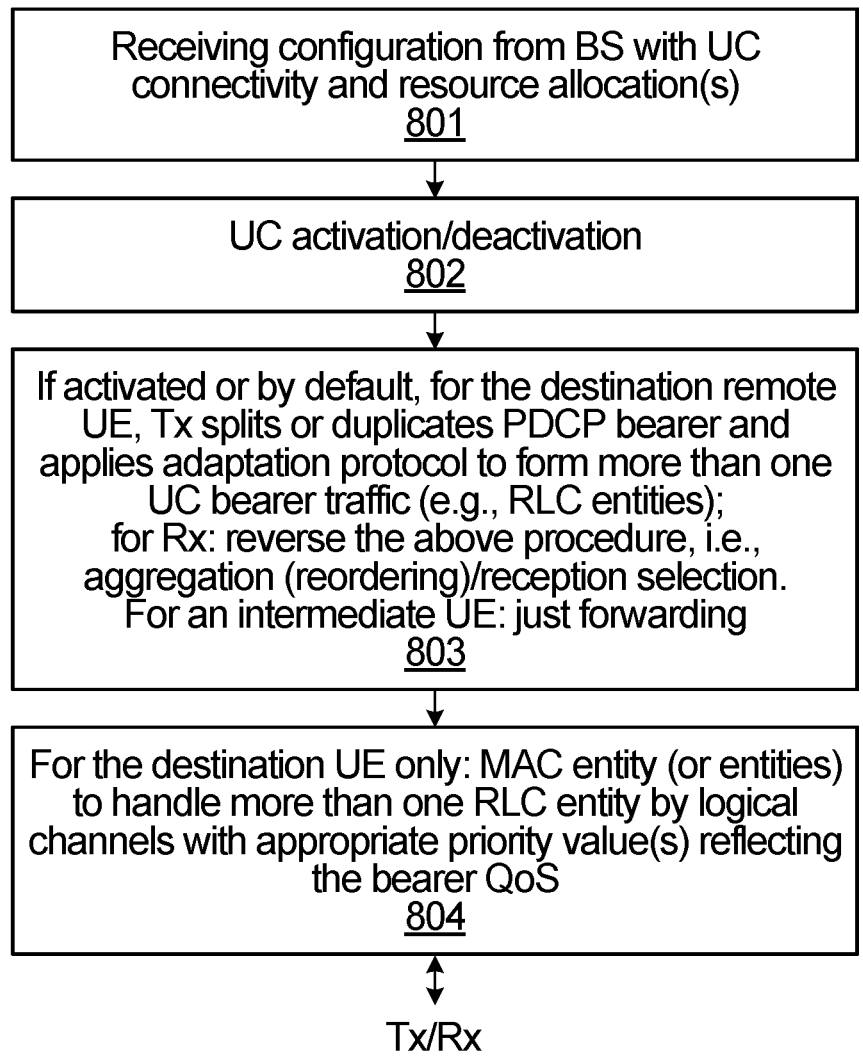
FIG. 8 is a flow chart illustrating example UE procedures for UE cooperation among in-coverage UEs.

FIG. 8 is a flow chart illustrating example UE procedures for UE cooperation among in-coverage UEs. For a remote UE, which may be a destination remote UE or a source remote UE, at 801 the remote UE receives configuration signaling for UC with configured connectivity (e.g., via multiple relay UEs only, via direct and indirect connections, with multiple-hop relays, or any combination of these), and with resource allocation(s) for UC transmissions and receptions. Signaling can be semi-static or dynamic, through RRC, DCI, or SCI, and may be received directly or indirectly from a BS in the example shown. 801 is illustrative of communicating a configuration, by receiving the configuration in the case of a remote UE in the example shown. A remote UE may also communicate signaling to enable relay-based UC, by receiving the signaling in the case of a remote UE. Signaling and a configuration are shown separately at 701 and 702 in FIG. 7, and similarly a UE may receive signaling and the configuration referenced at 801.

As noted above, UC may be operational after configuration or activated before UC operation begins. UC may also or instead be deactivated where no PDCP splitting and no UC adaptation protocol is to be applied, for example. This can be signaled through one or more of MAC CE, RRC, DCI, or SCI. A remote UE can indicate UC activation and/or deactivation with an indication message in some embodiments. Activation and deactivation are illustrated at 802.

Splitting and aggregation or reordering, and duplication, diversity selection, or joint detection if network coding is applied, are illustrated at 803. Which of these operations is actually performed depends on whether a UE is transmitting or receiving.

804 illustrates one or more MAC entities handling multiple RLC streams (or entities), including one for each UC bearer. One or more parameters including any of bearer priority, a reliability requirement, or a desired or required QoS, may impact bearer traffic handling, and may be reflected in a MAC logical channel with a logical group ID for example.

Transmission and reception of UC bearer traffic are shown generally as Tx/Rx, below 804 in FIG. 8.

For an intermediate relaying device, also referred to herein as an intermediate UE such as a relay UE or a helping remote UE, the same procedures as 801 and 802, and/or others related to communicating signaling to enable relay-based UC for example, may apply. For procedure 803, an intermediate UE may perform only forwarding of UC bearer traffic, although if any traffic is destined to the UE itself in a UC traffic bearer message, then the UE will get its own traffic and do some clean-up in the UC bearer traffic message.

Figure 9:
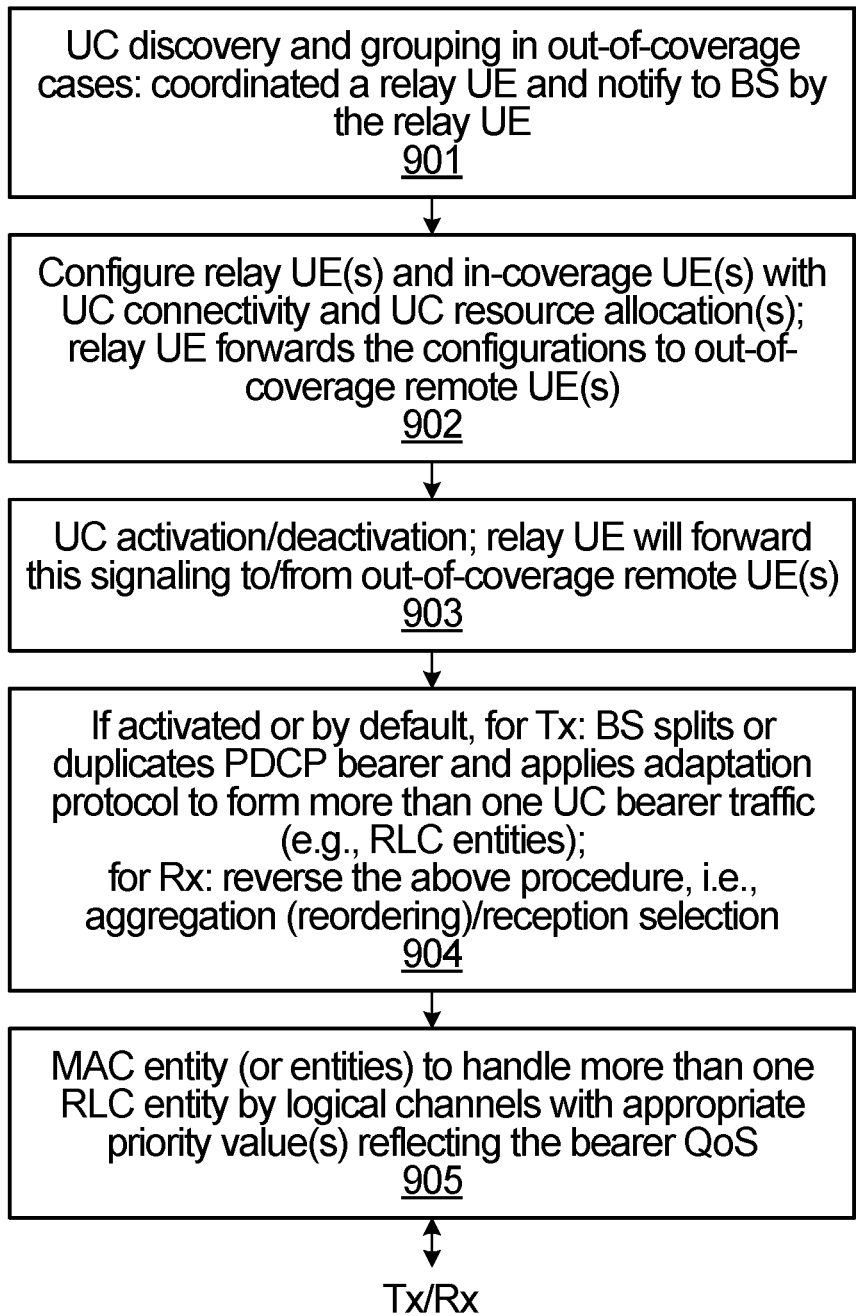
FIG. 9 is a flow chart illustrating example network equipment procedures for UE cooperation involving an out-of-coverage UE.

FIG. 9 is a flow chart illustrating example network equipment procedures for UE cooperation involving an out-of-coverage UE. At 901, UC grouping based Uu and SL measurements may be coordinated by a relay UE, and then reported to network equipment, indicated in FIG. 9 as a base station (BS) by way of example. At 902, the BS configures any in-coverage UE(s) with UC connectivity and with resource allocation(s) for UC transmissions and receptions, similar to 702 in FIG. 7. The relay UE forwards corresponding configurations to any out-of-coverage remote UE(s) in the example shown. Signaling can be semi-static or dynamic.

Similar to 701 and 702 in FIG. 7, 901 is illustrative of an operation that may involve communicating signaling to enable relay-based UC by a group of UEs, and 902 is illustrative of an operation that may involve communicating a configuration. In the case of a relay UE, communicating signaling and/or a configuration may involve either or both of receiving and transmitting. At 902 for example, the relay UE may receive a configuration from the BS and transmit the configuration to one or more other UEs.

903 is similar to 703 in FIG. 7, with the exception that signaling to or from any out-of-coverage remote UE(s) is forwarded by a relay UE in FIG. 9.

904 and 905 are similar to 704, 705 in FIG. 7. These network equipment procedures may be identical or substantially the same for in-coverage and out-of-coverage UE scenarios. As in FIG. 7, transmission and reception are shown generally as Tx/Rx at the bottom of FIG. 9. In the case of a relay UE or other intermediate relaying device, UC bearer traffic may be both received and transmitted during relaying.

Figure 10:
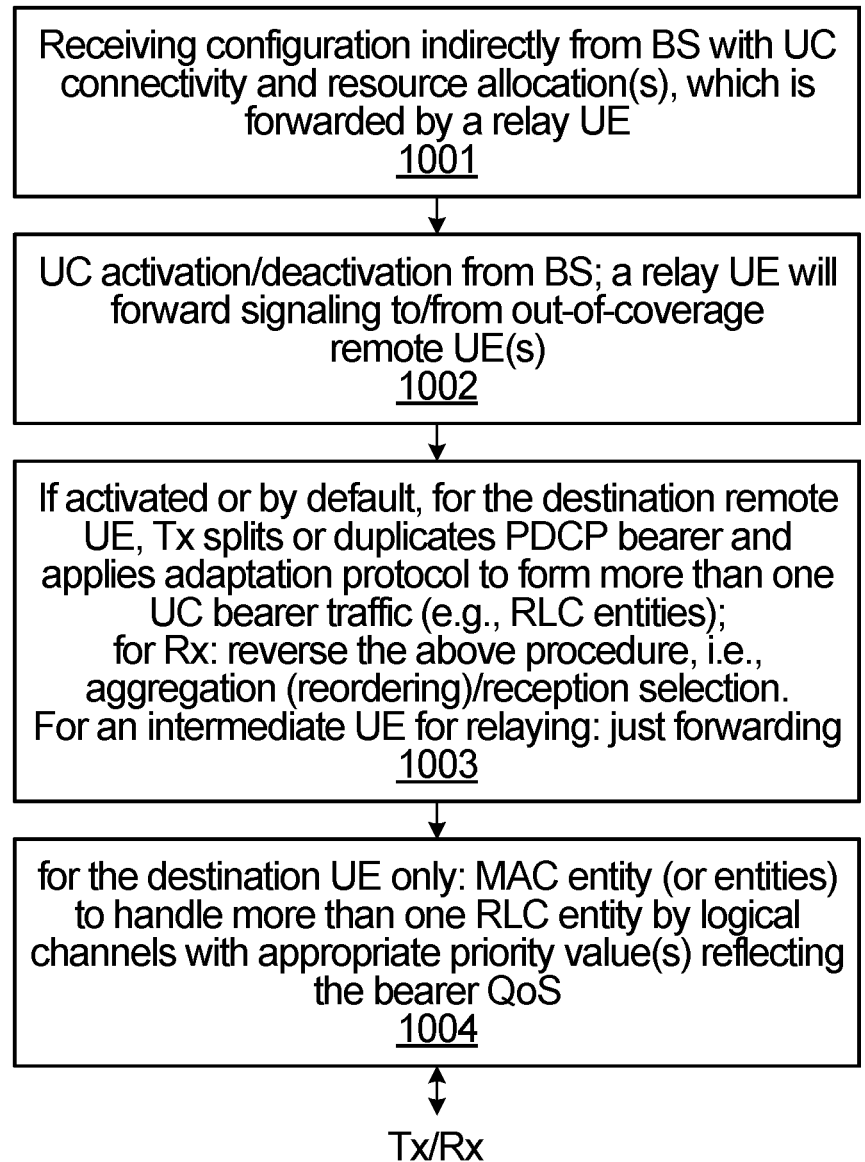
FIG. 10 is a flow chart illustrating example UE procedures for UE cooperation involving an out-of-coverage UE.

FIG. 10 is a flow chart illustrating example UE procedures for UE cooperation involving an out-of-coverage UE. FIG. 10 is substantially the same as FIG. 8, but with the exception that a destination remote UE that is out of coverage receives configuration signaling indirectly from a BS. A configuration, and signaling to enable relay-based UC in some embodiments, is forwarded to an out-of-coverage UE by a relay UE at 1001. A relay UE or other intermediate relaying device may communicate signaling and/or a configuration in a wireless communication network by receiving either or both of such signaling and configuration, and also or instead transmitting either or both of such signaling and configuration.

1002 is similar to 802 in FIG. 8, with the exception that signaling to or from any out-of-coverage remote UE(s) is forwarded by a relay UE in FIG. 10.

1003 and 1004 are similar to 803, 804 in FIG. 8. These UE procedures may be identical or substantially the same for in-coverage and out-of-coverage UE scenarios. Transmission and reception are shown generally at the bottom of FIG. 10, and as noted elsewhere an intermediate relaying device such as a relay UE may both receive and transmit UC bearer traffic during relaying.

Regarding any intermediate UEs, in some embodiments an in-coverage UE follows procedures 801, 802, 803. An out-of-coverage UE may follow procedures 1001 and 1002, but perform only forwarding of UC bearer traffic, although if any traffic is destined to the UE itself in a UC traffic bearer message, then the UE will get its own traffic and may do some clean-up in the UC bearer traffic message.

Figure 11:
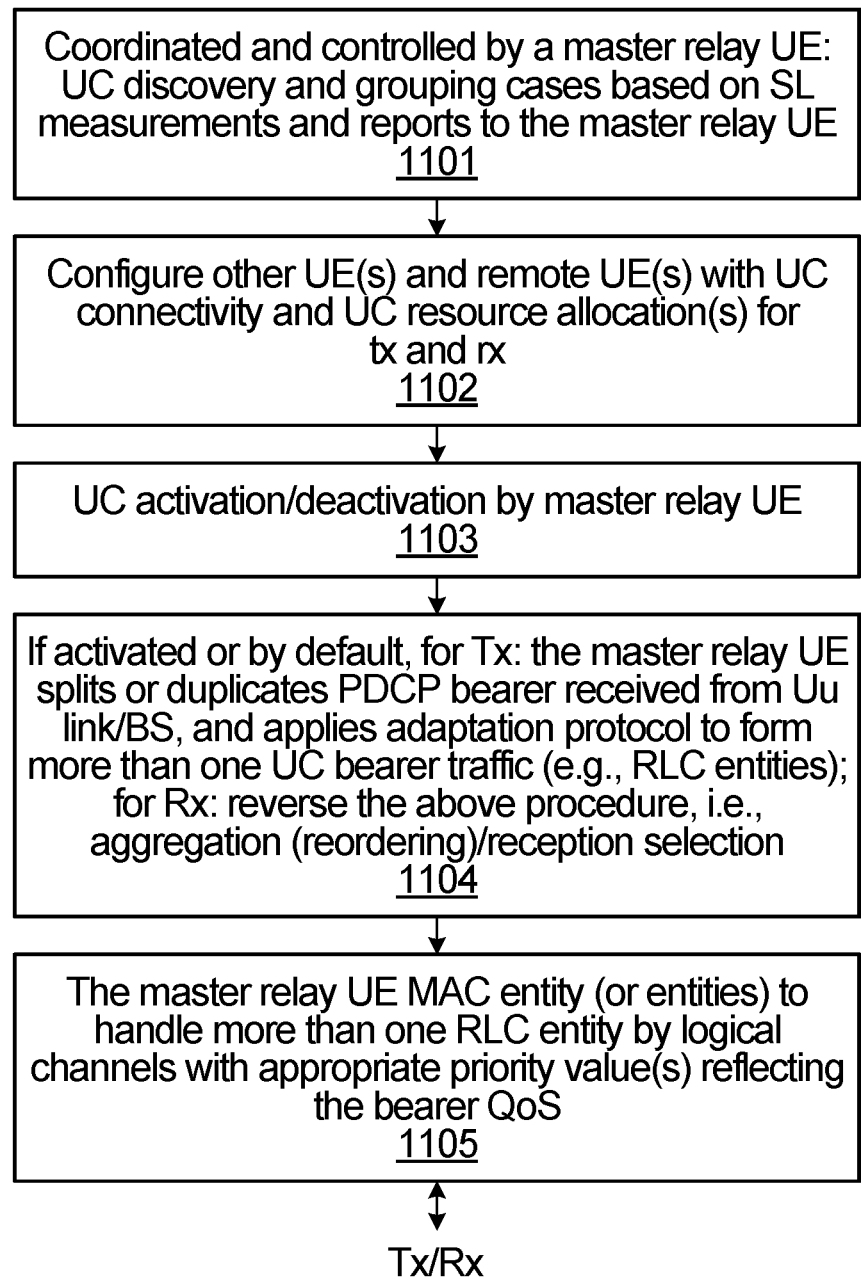
FIG. 11 is a flow chart illustrating example master relay UE procedures for UE cooperation over sidelink only.

FIG. 11 is a flow chart illustrating example master relay UE procedures for UE cooperation over sidelink only. In this case, the UC may be transparent to any BS, because only sidelink communications are involved. At 1101, UC grouping based on sidelink measurements is coordinated by a master relay UE. At 1102, the master relay UE configures other UE(s) in the UC group with the UC connectivity and with resource allocation(s) for UC transmissions and receptions. Signaling can be semi-static or dynamic, using sidelink RRC and/or SCI for example. 1101 and 1102 may be similar to 701 and 702 in FIG. 7, but involve a master relay UE rather than a BS. 1101 and 1102 provide further examples of communicating signaling and communicating a configuration, which involve a UE rather than a network device such as a BS transmitting signaling and transmitting a configuration.

1103 may be similar to 703, but again involves a master relay UE instead of a BS. UC may be operational after configuration or explicitly activated. UC may also or instead be deactivated where no PDCP splitting and no UC adaptation protocol are to be applied for example. This can be signaled by one or more of MAC CE, sidelink RRC, and SCI from the master relay UE.

1104 represents PDCP bearer splitting and aggregation or reordering, and duplication, diversity selection, or joint detection if network coding is applied, depending on Tx or Rx operation of the master relay UE.

1105 may be similar to 705 in FIG. 7, but again involving the master relay UE instead of a BS.

Transmission and reception of UC bearer traffic, as in other drawings, is shown generally at the bottom of FIG. 11.

Figure 12:
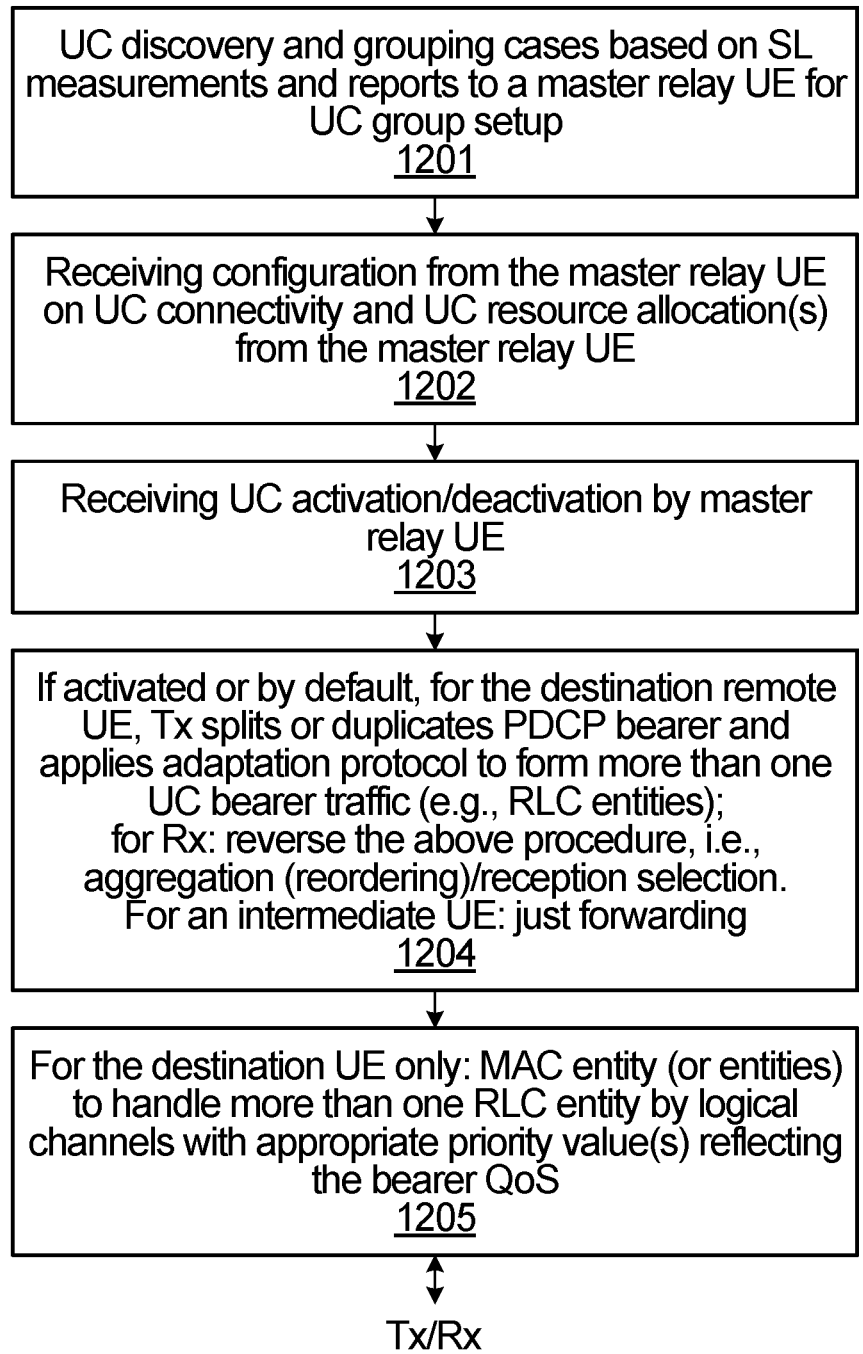
FIG. 12 is a flow chart illustrating example procedures of UEs other than a master UE for UE cooperation over sidelink only.

FIG. 12 is a flow chart illustrating example procedures of UEs other than a master UE for UE cooperation over sidelink only. For a remote UE, which may be a destination remote UE or a source remote UE, UC grouping based on SL measurements is coordinated by the master relay UE at 1201, and configuration signaling is received from the master relay at 1202. Signaling can be semi-static or dynamic, using sidelink RRC and/or SCI for example. 1201 and 1202 represent further illustrative examples of communicating signaling to enable relay-based UC and communicating a configuration.

1203 is similar to UC activation and/or deactivation as noted in other embodiments above, but potentially with signaling that involves the master relay UE instead of a BS or other network equipment.

UE procedures at 1204, 1205 are similar to other embodiments. 1204 may include such procedures as any one or more of PDCP bearer splitting, aggregation, reordering, duplication, diversity selection, and joint detection, and 1205 may involve MAC entity or entities handling multiple RLC streams (or entities), for example.

An intermediate UE or relaying device such as a non-master relay UE or a helping remote UE may support the same procedures as 1201 and 1202. For procedure 1204, an intermediate UE might only perform forwarding of UC bearer traffic, but with reception of its own traffic in a UC traffic bearer message and clean-up in the UC bearer traffic message if such a message includes traffic that is destined to that UE.

The flow charts in FIGS. 7 to 12 are illustrative examples. Methods may include additional, fewer, or different operations, performed in a similar order or a different order than shown.

Various examples are described above. Other embodiments are also contemplated.

Figure 13:
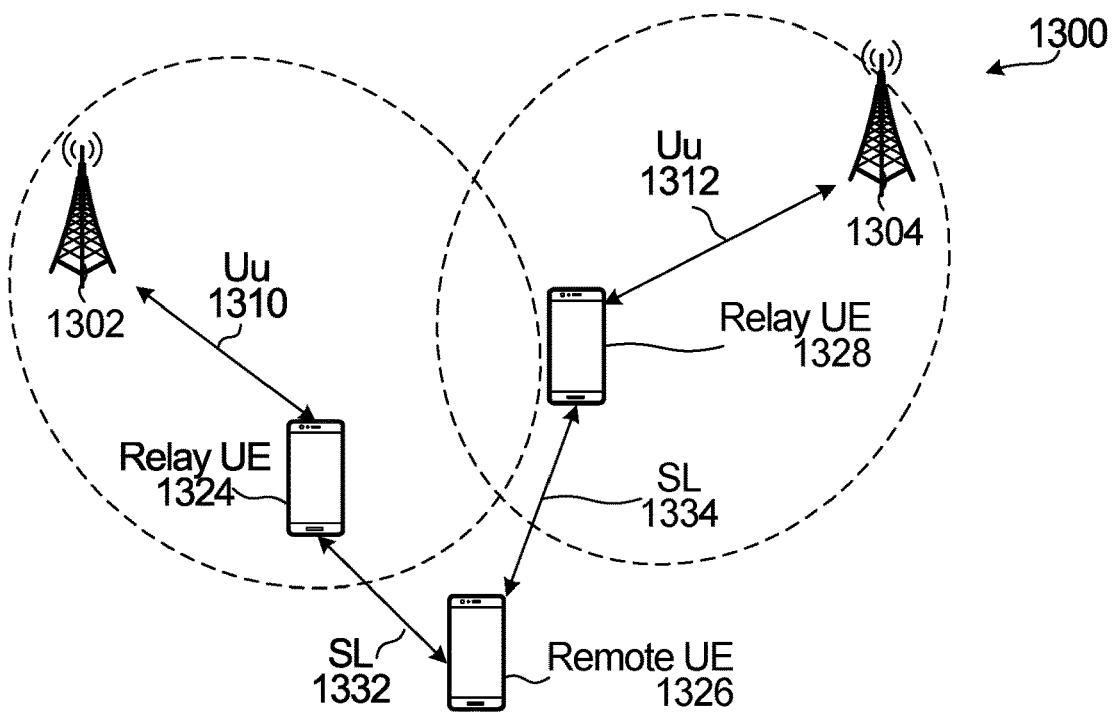
FIG. 13 is a block diagram of a further example communication system illustrating an additional multiple relay link scenario.

FIG. 13 is a block diagram of a further example communication system illustrating an additional multiple relay link scenario. In the example communication system 1300, each relay UE 1324, 1328 communicates with different network equipment 1302, 1304, which may be different TRPs for example, over Uu links 1310, 1312. There are two relay links in the example shown, and each relay link includes a Uu segment 1310, 1312 between network equipment 1302, 1304 and a relay UE 1324, 1328, and a sidelink segment 1332, 1334 between each relay UE and the remote UE 1326.

FIG. 13 illustrates an embodiment that may support UC based on Dual Connectivity (DC) or Carrier Aggregation (CA). In this example, the remote UE 1326 has two (or more in other embodiments) paths or connections, each via a relay UE 1324, 1328, to different network equipment 1302, 1304 such as different base stations, TRPs in the same cell or different cells, or satellite stations, etc. The remote UE 1326 has relaying associations with the two relay UEs 1324, 1328 in two cells or coverage areas. The relay UEs 1324, 1328 may support L2 and/or L3 relaying.

The relay paths or routes can be configured separately, for example with different channel conditions and transmission parameters such as numerologies, MCS, bandwidths, etc. Thus, in some embodiments there may be a load balance issue among the multiple paths.

The DC or CA configuration on the remote UE 1326 can be directly from either or both of the network equipment 1302, 1304 depending on UE location relative to network equipment coverage, or be forward by one or both of the relay UEs 1324, 1328. Signaling may be semi-static or dynamic, for example using one or more of RRC, sidelink RRC, DCI, and SCI.

The relay UEs 1324, 1328 support transfer of received relaying traffic to the remote UE 1326. In an embodiment, PDCP bearer is split or duplicated into two RLC streams or entities at 1302, 1304 and the processed PDCP traffic is transmitted, based on relaying Uu configuration, to the individual relay UE 1324, 1328. Each relay UE 1324, 1328 converts Uu link format to sidelink format and then transmits the converted traffic based on the relaying sidelink configuration to the remote UE 1326.

The remote UE 1326 receives data from the two paths to perform PDCP bearer reordering or selective reception, for example. For reordering or selective reception at the remote UE 1326, or at the network equipment 1302, 1304 for uplink traffic, one or more timers or time windows can be used for reception decisions.

For traffic transmission from the remote UE 1324, reverse procedures are used in some embodiments. The remote UE 1324 performs the same process as the network equipment 1302, 1304, the relay UEs 1324, 1328 convert sidelink format to Uu link format, to transmit traffic streams to the network equipment, and the network equipment performs PDCP bearer reordering or selective reception.

Figure 14:
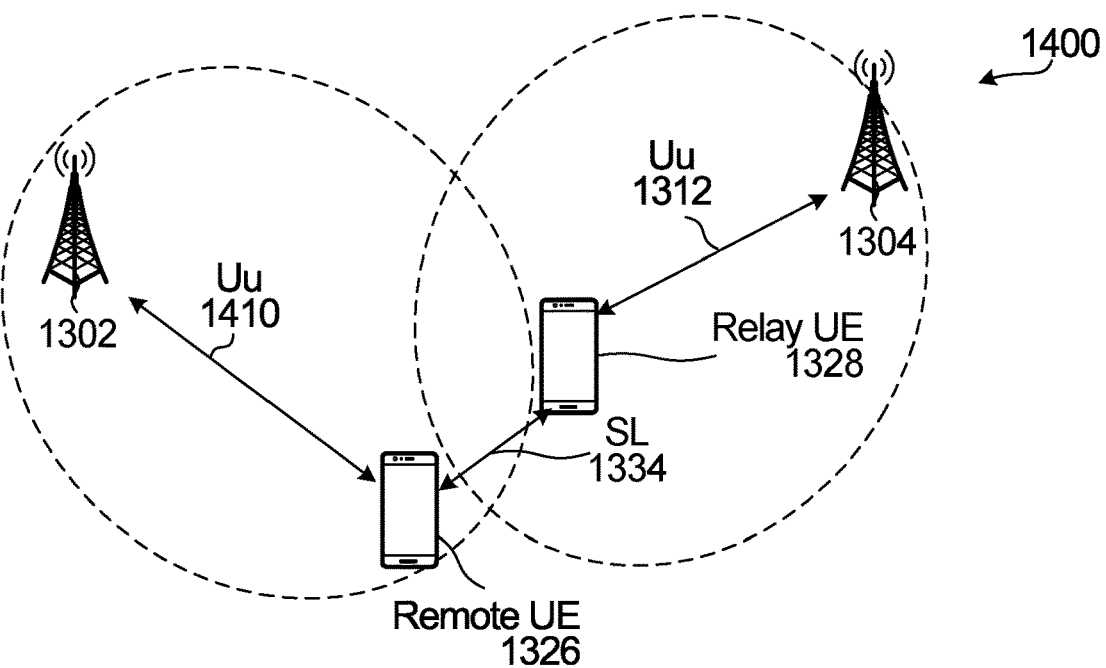
FIG. 14 is a block diagram of yet another example communication system illustrating a multiple link scenario.

FIG. 14 is a block diagram of yet another example communication system illustrating a multiple link scenario. The example 1400 is the same as the example 1300, with the exception that the remote UE 1326 is within a coverage area of, and has a Uu link 1410 with, the network equipment 1302. The remote UE 1326 still has two connections as in FIG. 13, but now including one with the network equipment 1302 directly through the Uu link 1410 and the other via a relaying association with the relay UE 1328 to the network equipment 1304.

In the example 1400, the DC or CA configuration on the remote UE 1326 can be directly from the network equipment 1302 and/or be forward by the relay UE 1328, with signaling being semi-static or dynamic, using any one or more of RRC, sidelink RRC, DCI, and SCI.

Regarding downlink traffic to the remote UE 1326, the relay UE 1328 will transfer received relaying traffic to the remote UE. In some embodiments, a PDCP bearer is split or duplicated into two RLC streams (or entities) at the network equipment 1302, 1304. The network equipment 1302 transmits the processed PDCP traffic directly to the remote UE 1326 and the network equipment 1304 transmits its processed traffic, based on relaying Uu configuration, to the relay UE 1328. The remote UE 1326 will receive traffic from the network equipment 1302 and the relay UE 1328, which converts Uu link format to sidelink format and then transmits the converted traffic based on the relaying sidelink configuration to the remote UE 1326. In this example, the remote UE 1326 employs two sets of protocol stacks in some embodiments, including one for Uu and the other for sidelink. Examples are discussed above with reference to FIGS. 4A to 4D.

Once having received data from the two connections, links, or paths, the remote UE 1326 performs PDCP bearer reordering or selective reception.

Reverse procedures apply for upward or uplink traffic in some embodiments. The remote UE 1326 splits or duplicates data and transmits the data to the network equipment 1302 and the relay UE 1328, the relay UE converts sidelink format to Uu format and transmits to the network equipment 1304, and the network equipment 1302, 1304 perform PDCP bearer reordering or selective reception.

Other features may also or instead be provided in some embodiments. Relay UE switching, for UC or other related aspects, is an example. This may be especially useful for mobile UEs, where any of relay UE(s) and remote UE(s) can be moving around such that one or more connections among network equipment, relay UE(s), and remote UE(s) can vary.

Network equipment, a relay UE, and/or a remote UE in a UC group may trigger a connection change, connection switching, or re-establishing a connection.

Network equipment, a relay UE, and/or remote UE may keep a list of connection quality indications for one or more UEs, including connected relay UE(s) and/or remote UE(s) in the UC group, to enable fast connection switching or changes. In some embodiments, measurement information may include sensing based channel busy ratio (CBR) and sidelink-RSRP.

Any UE may experience connected (active) state, inactive state or idle state. A relay UE or remote UE in a UC group may transition to inactive or idle state, which may result in connection availability changes in the UC group and may trigger re-setup or reconfiguration of a UC group.

For a UE, a Uu link UE ID can be different from, or not used as, a sidelink UE ID. Uu based group ID can also or instead be different from, or not used as, a sidelink-based group ID. Destination ID and source ID for UC can be used for MAC destination ID and source ID in some embodiments. Uu, sidelink, and V2X MAC header or sub-header can be different.

MAC logical channels, referenced in some embodiments above, may each be associated with a logical channel id, may have different QoS or priority for scheduling and transmission, and can handle different QoS or priority (such as PPPP-ProSe per packet priority or PPPR-ProSe per packet reliability) associated with a PDCH bearer. These QoS and priority features can be pre-configured or higher layer signaling configured, for example.

Figure 15:
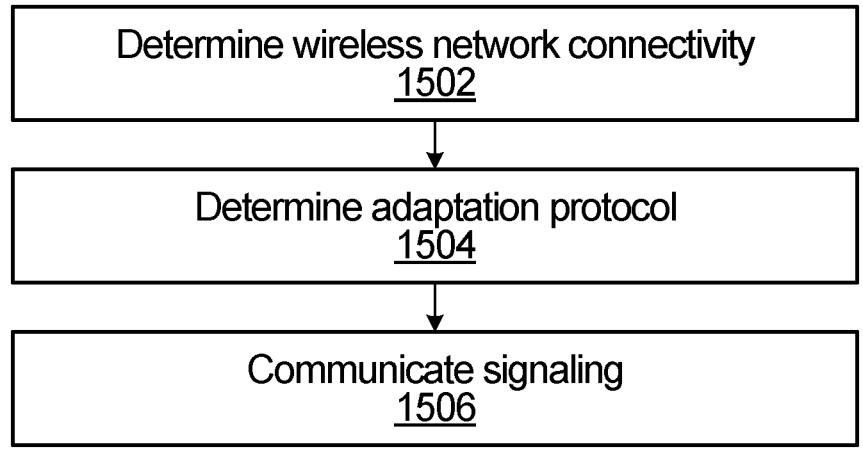
FIGS. 15 and 16 are flow diagrams illustrating example methods according to further embodiments.
Figure 16:
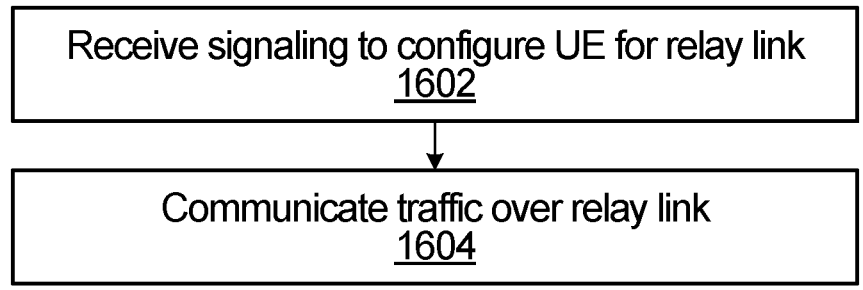

Various features are described in detail at least above. More generally, methods may involve fewer, additional, or different operations than those described above, for example. FIGS. 15 and 16 are flow diagrams illustrating example methods according to further embodiments.

The example method 1500 in FIG. 15 involves determining, at 1502, wireless network connectivity that is available for a relay link between a UE and a wireless communication network. Wireless connectivity may include, for example, any one or more of direct (e.g., Uu), indirect (e.g., Uu and SL), and multi-hop (including SL-only) links, as described elsewhere herein.

At 1504, an adaptation protocol is determined, based on the connectivity determined at 1502, to adapt a protocol stack architecture associated with the determined connectivity to supporting the relay link, and at 1506 signaling to enable configuration of the relay link in accordance with the connectivity and the adaptation protocol is communicated. Detailed examples of an AP and configuration signaling are provided elsewhere herein.

Methods consistent with the example method 1500 may include any of various features, implemented in any of various ways. For example, embodiments may include any one or more of the following features, and/or others disclosed herein, in any of various combinations:

the determining at 1502 involves determining the connectivity based on a measurement associated with a candidate communication link that is a candidate for inclusion in the relay link;

determining the connectivity based on the measurement involves receiving, from a component that is involved in the candidate communication link, signaling associated with the measurement;

an operation of communicating signaling to cause a first component that is involved in the candidate communication link to transmit, to a second component that is involved in the candidate communication link, discovery signaling to enable the second component to perform the measurement;

determining the connectivity based on the measurement involves receiving, from the second component, signaling associated with the measurement;

the discovery signaling is or includes reference signaling;

the signaling associated with the measurement is or includes signaling indicative of the measurement;

the signaling associated with the measurement is or includes signaling indicative of whether the measurement satisfies a condition for configuring, as the relay link, a relay link that includes the candidate communication link;

determining the adaptation protocol at 1504 involves configuring a set of attributes indicative of one or more characteristics of a bearer associated with the relay link;

the set of attributes includes any one or more of: bearer identity such as a UC bearer identity, such as a number or other identifier; one or more destination identifiers; one or more source identifiers; total number of bearer segmentations allocated to or otherwise associated with a UE; an indication as to whether a bearer is a duplicate bearer or multiplexing bearer to one or more other bearers; an indication of path or route number or other identifier of a relay path or route; an indication of a total number of UC paths or routes for a UE; an indication of a time stamp or adaptation reference of a relaying bearer for use in adaptation point processing; an indication as to being UC or relay only traffic; an indication to a control operation;

an operation of communicating traffic between the UE and the wireless communication network over the relay link;

the traffic is or includes bearer data and an adaptation header that includes information indicative of the set of attributes;

the relay link is a secondary relay link in addition to at least a primary relay link between the UE and the wireless communication network;

an operation of communicating traffic between the UE and the wireless communication network over the primary relay link and the secondary relay link;

the communicating involves performing one or more of: splitting data for transmission over the primary relay link and the secondary relay link; aggregating data received over the primary relay link and the secondary relay link;

the primary relay link is a link between the UE and first network equipment in the wireless communication network, and the secondary relay link is a link between the UE and second network equipment in the wireless communication network;

a method is performed by network equipment in the wireless communication network;

the relay link is a secondary relay link in addition to at least a primary relay link between the UE and the wireless communication network, and a method is performed by a relay UE of the primary relay link.

The example method 1600 in FIG. 16 involves receiving at 1602, by a UE, signaling to configure the UE for a relay link between a remote UE and a wireless communication network in accordance with wireless network connectivity that is available for the relay link and an adaptation protocol that is based on the connectivity to adapt a protocol stack architecture associated with the determined connectivity to supporting the relay link. The receiving UE may, but need not necessarily, be the remote UE. The example method 1600 also involves communicating, by the UE, traffic between the remote UE and the wireless communication network over the relay link.

As noted above for the example method 1500, methods consistent with the example method 1600 may include any of various features, implemented in any of various ways. For example, embodiments may include any one or more of the following features, and/or others disclosed herein, in any of various combinations:

an operation of performing, by the UE, a measurement associated with a candidate communication link that is a candidate for inclusion in the relay link;

an operation of transmitting, by the UE, signaling associated with the measurement;

the signaling associated with the measurement includes signaling indicative of the measurement;

the signaling associated with the measurement includes signaling indicative of whether the measurement satisfies a condition for configuring, as the relay link, a relay link that includes the candidate communication link;

an operation of receiving, by the UE, signaling to cause the UE to transmit, to a second UE involved in a candidate communication link that is a candidate for inclusion in the relay link, discovery signaling to enable the second UE to perform a measurement associated with the candidate communication link;

the discovery signaling is or includes reference signaling;

the adaptation protocol involves a set of attributes indicative of one or more characteristics of a bearer associated with the relay link;

the set of attributes includes any one or more of: bearer identity, such as a number or other identifier; one or more destination identifiers; one or more source identifiers; total number of bearer segmentations allocated to or otherwise associated with a UE; an indication as to whether a bearer is a duplicate bearer or multiplexing bearer to one or more other bearers; an indication of path or route number or other identifier of a relay path or route; an indication of a total number of UC paths or routes for a UE; an indication of a time stamp or adaptation reference of a relaying bearer for use in adaptation point processing; an indication as to being UC or relay only traffic; an indication to a control operation;

the traffic includes bearer data and an adaptation header that includes information indicative of the set of attributes;

the relay link is a secondary relay link in addition to at least a primary relay link between the remote UE and the wireless communication network;

the communicating at 1604 involves communicating the traffic between the remote UE and the wireless communication network over the primary relay link and the secondary relay link;

the communicating involves performing one or more of: splitting data for transmission over the primary relay link and the secondary relay link; aggregating data received over the primary relay link and the secondary relay link; relaying the traffic along the primary relay link and the secondary relay link;

the primary relay link is a link between the UE and first network equipment in the wireless communication network, and the secondary relay link is a link between the UE and second network equipment in the wireless communication network;

the UE is a relay UE of the relay link;

as noted above, the UE may be the remote UE;

the UE is outside a coverage area of the wireless communication network, and the receiving at 1602 involves receiving the signaling from a further UE that is within the coverage area of the wireless communication network.

FIGS. 15 and 16, as well as FIGS. 7 to 12, encompass various other method embodiments. For example, a method may involve communicating, in a wireless communication network, signaling to enable relay-based UC by a group of UEs. Communicating signaling may involve transmitting such signaling, by a network device or a master relay UE for example, receiving such signaling by each UE in the group of UEs, or both, as in the case of relaying such signaling by a relay UE.

A group of UEs includes at least one relay UE and at least one remote UE. Multiple relay UEs, multiple remote UEs, or both, may be part of a group of UEs, also referred to herein as a cooperation group. A relay link or path may be a single-hop link or path through a single relay UE for example, or a multi-hop path through more than one intermediate relaying device. An intermediate relaying device may be a relay UE or a helping remote UE, for example.

A method may also involve communicating a configuration in the wireless communication network, for each UE in the group of UEs for example. From a UE perspective, communicating a configuration may involve receiving the configuration, by each UE. From a network device perspective, communicating a configuration may involve transmitting the configuration to one or more UEs. In the case of an intermediate relaying device such as a relay UE or a helping remote UE, communicating a configuration may involve both receiving the configuration and transmitting the configuration.

According to embodiments disclosed herein, the configuration includes an adaptation protocol for processing of UC bearer traffic. The adaptation protocol may be used by a destination device such as a network device or a UE for processing received UC bearer traffic. An adaptation protocol may also or instead be used by a source device, which may be a network device or a UE, to generate UC bearer traffic.

UC bearer traffic may include a UC bearer and UC bearer attributes. A UC bearer may be or include either a split PDCP bearer or a duplicated PDCP bearer indicated in the UC bearer attributes. One or more PDCP bearers may be split or duplicated. For example, a PDCP message or part of such a message may be packaged as a form of UC bearer traffic, so that any relay UEs or other intermediate relaying devices do not need to reference PDCP specifically. Operation information associated with the UC bearer, to indicate a split or duplication operation at a transmission end for example, may be included in the UC bearer attributes to record such operation or processing information to allow reverse or inverse processing to be performed at a receiving end. Other examples of UC bearer attributes are also disclosed elsewhere herein.

A method may also involve communicating UC bearer traffic with the remote UE. The remote UE may be a source or destination, and accordingly communicating UC bearer traffic with the remote UE may involve receiving the UC bearer traffic directly or indirectly from the remote UE or transmitting the UC bearer traffic directly or indirectly to the remote UE.

A relay UE or other intermediate relaying device, for example, may relay the UC bearer traffic from or toward the remote UE. Such relaying of UC bearer traffic may involve PHY, MAC, and RLC, and AP layer processing, such as decoding, and forwarding the UC bearer traffic based on the UC bearer attributes.

In some embodiments, relaying involves receiving the UC bearer traffic over a first air interface, and an air interface conversion to associated PHY, MAC, and RLC layers for the forwarding of the UC bearer traffic over a second air interface of a different type than the first air interface. Examples of different types of air interfaces are provided elsewhere herein. In an embodiment, the first air interface and the second air interface include an access air interface and a sidelink air interface.

A method may involve receiving the UC bearer traffic at the remote UE. The remote UE may receive UE bearer traffic from multiple direct or indirect links or paths, such as from one or more relay UEs, and perform such operations as aggregating the split PDCP bearer or conducting joint detection of the duplicated PDCP bearer in the UC bearer traffic. Such operations may be generally referred to as "combining" the split or duplicated PDCP bearer. Combining bearer traffic that is received via multiple paths is intended to convey the notion of performing, at reception, an operation that is a reverse or inverse operation to a "generating" operation that was used at a transmitting end to generate the UC bearer traffic.

A generating operation may involve splitting or duplicating one or more PDCP bearers into multiple portions. Each portion, including a UC bearer and UC bearer attributes, forms UC bearer traffic into one RLC entity in some embodiments. In an embodiment, a method involves such splitting or duplicating the PDCP bearer to generate the UC bearer traffic, and transmitting the UC bearer traffic from the remote UE. Relay-based UC may involve generation and transmission of UC bearer traffic from a remote UE, as in this example, or from another source device such as a network device or another UE.

As noted elsewhere herein, communicating a configuration may involve transmitting and/or receiving the configuration. In an embodiment, communicating a configuration involves transmitting, by a base station or a master relay UE for example, a UE configuration for each UE in the group of UEs.

An adaptation protocol may specify or otherwise indicate processing of UC bearer traffic at reception, transmission, or both, and therefore a configuration may include the adaptation protocol for processing the UC bearer traffic by any of several types of devices, including UEs or a network device. In some embodiments, a network device may process UC bearer traffic in the same way as a remote UE.

A network device such as a base station may communicate UC bearer traffic with one or more other devices, including not only relay UE(s), but also or instead the remote UE directly. An example of a network device communicating with a relay UE and a remote UE directly is shown in FIG. 4B.

Communicating signaling to enable relay-based UC, communicating a configuration, or both, may involve unicast or group cast signaling, as noted elsewhere herein.

In some embodiments, such signaling and configuration may be communicated separately. By way of example, FIG. 7 shows signaling and configuration separately at 701, 702. In other embodiments, communicating the signaling and configuration may involve communicating both the signaling and the configuration in the same signaling that includes both the signaling to enable relay-based UC and a configuration.

Relay-based UC and the configuration, for one or more UEs and/or one or more network devices, may be pre-configured, semi-statically configured through RRC signaling for example, or dynamically configured.

Other embodiments may include any of various features, implemented in any of various ways. For example, embodiments may include any one or more features disclosed elsewhere herein.

Embodiments are described above in the context of example methods. Other embodiments are also possible.

Figure 17A:
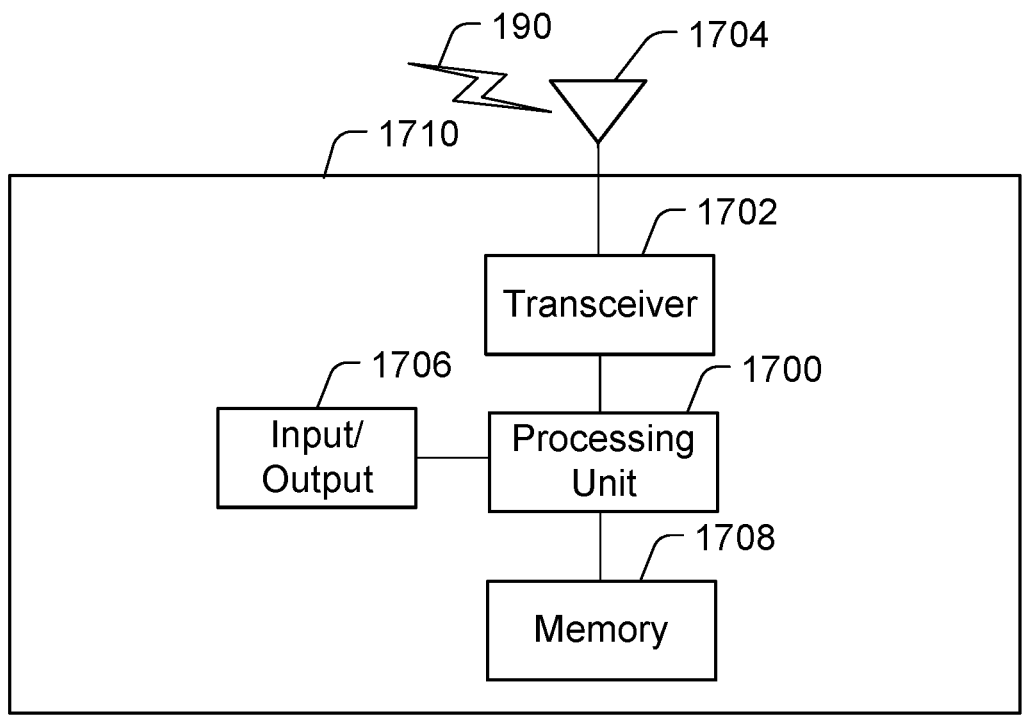
FIGS. 17A and 17B are block diagrams illustrating example devices that may implement the methods and teachings according to this disclosure.
Figure 17B:
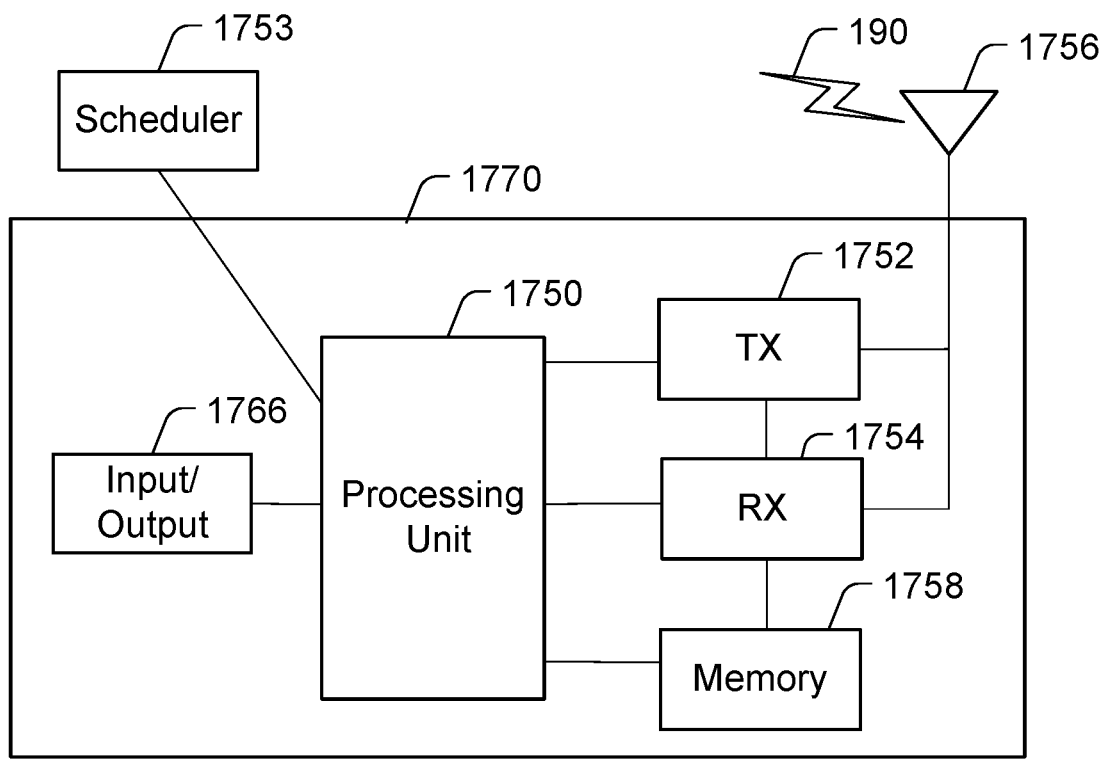

See, for example, FIGS. 17A and 17B which illustrate example devices that may implement the methods and teachings according to this disclosure.

FIG. 17A illustrates an example ED 1710, and FIG. 17B illustrates an example base station 1770. These components could be used in the system 100 (FIG. 1) or in any other suitable system.

As shown in FIG. 17A, the ED 1710 includes at least one processing unit 1700. The processing unit 1700 implements various processing operations of the ED 1710. For example, the processing unit 1700 could perform signal coding, data processing, power control, input processing, output processing, or any other functionality enabling the ED 1710 to operate in a communication system. The processing unit 1700 may also be configured to implement some or all of the functionality or embodiments described in more detail herein. Each processing unit 1700 includes any suitable processing or computing device configured to perform one or more operations. Each processing unit 1700 could, for example, include a microprocessor, microcontroller, digital signal processor, field programmable gate array, or application specific integrated circuit.

The ED 1710 also includes at least one transceiver 1702. The transceiver 1702 is configured to modulate data or other content for transmission by at least one antenna or NIC (Network Interface Controller) 1704. The transceiver 1702 is also configured to demodulate data or other content received by the at least one antenna 1704. Each transceiver 1702 includes any suitable structure for generating signals for wireless transmission and/or processing signals received wirelessly or by wire. Each antenna 1704 includes any suitable structure for transmitting and/or receiving wireless signals. One or multiple transceivers 1702 could be used in the ED 1710, and one or multiple antennas 1704 could be used in the ED 1710. Although shown as a single functional unit, a transceiver 1702 could be implemented using at least one transmitter and at least one separate receiver.

The ED 1710 further includes one or more input/output devices 1706 or interfaces. The input/output devices 1706 facilitate interaction with a user or other devices (network communications) in the network. Each input/output device 1706 includes any suitable structure for providing information to or receiving/providing information from a user, such as a speaker, microphone, keypad, keyboard, display, or touch screen, including network interface communications.

In addition, the ED 1710 includes at least one memory 1708. The memory 1708 stores instructions and data used, generated, or collected by the ED 1710. For example, the memory 1708 could store software instructions or modules configured to implement some or all of the functionality or embodiments described above and that are executed by the processing unit(s) 1700. Each memory 1708 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 17B, the base station 1770 includes at least one processing unit 1750, at least one transmitter 1752, at least one receiver 1754, one or more antennas 1756, at least one memory 1758, and one or more input/output devices or interfaces 1766. A transceiver, not shown, may be used instead of the transmitter 1752 and receiver 1754. A scheduler 1753 may be coupled to the processing unit 1750. The scheduler 1753 may be included within or operated separately from the base station 1770. The processing unit 1750 implements various processing operations of the base station 1770, such as signal coding, data processing, power control, input processing, output processing, or any other functionality. The processing unit 1750 can also be configured to implement some or all of the functionality or embodiments described in more detail herein. Each processing unit 1750 includes any suitable processing or computing device configured to perform one or more operations. Each processing unit 1750 could, for example, include a microprocessor, microcontroller, digital signal processor, field programmable gate array, or application specific integrated circuit.

Each transmitter 1752 includes any suitable structure for generating signals for wireless transmission to one or more EDs or other devices. Each receiver 1754 includes any suitable structure for processing signals received wirelessly or by wire from one or more EDs or other devices. Although shown as separate components, at least one transmitter 1752 and at least one receiver 1754 could be combined into a transceiver. Each antenna 1756 includes any suitable structure for transmitting, receiving, or both transmitting and receiving wireless signals. While a common antenna 1756 is shown here as being coupled to both the transmitter 1752 and the receiver 1754, one or more antennas 1756 could be coupled to the transmitter(s) 1752, and one or more separate antennas 1756 could be coupled to the receiver(s) 1754. Each memory 1758 includes any suitable volatile and/or non-volatile storage and retrieval device(s) such as those described above in connection to the ED 1710. The memory 1758 stores instructions and data used, generated, or collected by the base station 1770. For example, the memory 1758 could store software instructions or modules configured to implement some or all of the functionality or embodiments described herein and that are executed by the processing unit(s) 1750.

Each input/output device 1766 facilitates interaction with a user or other devices (network communications) in the network. Each input/output device 1766 includes any suitable structure for providing information to or receiving/providing information from a user, including network interface communications.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by these or other modules. The respective units or modules may be implemented using hardware, components that execute software, or a combination thereof. For instance, one or more of the units or modules may be or include one or more integrated circuits, such as field programmable gate arrays (FPGAs) or application-specific integrated circuits (ASICs). It will be appreciated that where the modules are implemented using software, they may be retrieved by a processor, in whole or part as needed, individually or together for processing, in single or multiple instances, and that the modules themselves may include instructions for further deployment and instantiation.

In general, hardware, firmware, components which execute software, or some combination thereof could be used in implementing features disclosed herein. Electronic devices that might be suitable for implementing any or all of these components include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

Any of various types of memory devices could be implemented. Either or both of the memory 1708 and the memory 1758, for example, could include one or more physical memory devices. Solid-state memory devices such as a Flash memory device could be implemented. Memory devices with movable or even removable storage media could also or instead be implemented.

FIG. 17A and FIG. 17B illustrate examples of a UE and network equipment, respectively, in which embodiments could be implemented. More generally, an apparatus may include a processor and a non-transitory computer readable storage medium, such as the processing unit 1700, 1750 and memory 1708, 1758 in FIG. 17A or FIG. 17B. Such an apparatus may be a UE, including a relay UE, a source UE, a destination UE, a helping remote UE, or a remote UE. Another example of an apparatus is network equipment, which may be a gNB, a TRP, a base station, or any other type of network equipment referenced herein. In an embodiment, the storage medium stores programming for execution by the processor, and the programming includes instructions to perform a method as disclosed herein. For example, the instructions, when executed by a processor, may cause the processor to perform any of various operations.

Another embodiment relates to a computer program product that includes a non-transitory computer readable storage medium storing programming. The programming includes instructions to perform a method as disclosed herein.

Thus, a non-transitory computer readable storage medium storing programming may be implemented in a computer program product, or in other embodiments in an apparatus such as an apparatus that includes a communication interface and a processor coupled to the communication interface and the computer readable storage medium. In some embodiments, the programming includes instructions to cause a processor to perform operations consistent with the example method 1500, including: determining wireless network connectivity that is available for a relay link between a UE and a wireless communication network; determining an adaptation protocol, based on the determined connectivity, to adapt a protocol stack architecture associated with the determined connectivity to supporting the relay link; and communicating signaling through the communication interface to enable configuration of the relay link in accordance with the connectivity and the adaptation protocol.

Embodiments that are implemented using an apparatus or computer program product may include any one or more of the following features, and/or others disclosed herein, in any of various combinations:

determining connectivity involves determining the connectivity based on a measurement associated with a candidate communication link that is a candidate for inclusion in the relay link;

determining the connectivity based on the measurement involves receiving, from a component that is involved in the candidate communication link, signaling associated with the measurement;

an operation of communicating signaling to cause a first component that is involved in the candidate communication link to transmit, to a second component that is involved in the candidate communication link, discovery signaling to enable the second component to perform the measurement;

determining the connectivity based on the measurement involves receiving, from the second component, signaling associated with the measurement;

the discovery signaling is or includes reference signaling;

the signaling associated with the measurement is or includes signaling indicative of the measurement;

the signaling associated with the measurement is or includes signaling indicative of whether the measurement satisfies a condition for configuring, as the relay link, a relay link that includes the candidate communication link;

determining the adaptation protocol involves configuring a set of attributes indicative of one or more characteristics of a bearer associated with the relay link;

the set of attributes includes any one or more of: bearer identity such as UC bearer identity, such as a number or other identifier; one or more destination identifiers; one or more source identifiers; total number of bearer segmentations allocated to or otherwise associated with a UE; an indication as to whether a bearer is a duplicate bearer or multiplexing bearer to one or more other bearers; an indication of path or route number or other identifier of a relay path or route; an indication of a total number of UC paths or routes for a UE; an indication of a time stamp or adaptation reference of a relaying bearer for use in adaptation point processing; an indication as to being UC or relay only traffic; an indication to a control operation;

an operation of communicating traffic between the UE and the wireless communication network over the relay link;

the traffic is or includes bearer data and an adaptation header that includes information indicative of the set of attributes;

the relay link is a secondary relay link in addition to at least a primary relay link between the UE and the wireless communication network;

an operation of communicating traffic between the UE and the wireless communication network over the primary relay link and the secondary relay link;

the communicating involves performing one or more of: splitting data for transmission over the primary relay link and the secondary relay link; aggregating data received over the primary relay link and the secondary relay link;

the primary relay link is a link between the UE and first network equipment in the wireless communication network, and the secondary relay link is a link between the UE and second network equipment in the wireless communication network;

an apparatus or processor is implemented in network equipment in the wireless communication network;

the relay link is a secondary relay link in addition to at least a primary relay link between the UE and the wireless communication network, and an apparatus or processor is implemented in a relay UE of the primary relay link.

In some embodiments, programming includes instructions to cause a processor to perform operations consistent with the example method 1600, including receiving, by a UE, signaling to configure the UE for a relay link between a remote UE and a wireless communication network in accordance with wireless network connectivity that is available for the relay link and an adaptation protocol that is based on the connectivity to adapt a protocol stack architecture associated with the determined connectivity to supporting the relay link; and communicating, by the UE, traffic between the remote UE and the wireless communication network over the relay link.

Embodiments that are implemented using an apparatus or computer program product may include any one or more of the following features, and/or others disclosed herein, in any of various combinations:

an operation of performing, by the UE, a measurement associated with a candidate communication link that is a candidate for inclusion in the relay link;

an operation of transmitting, by the UE, signaling associated with the measurement;

the signaling associated with the measurement includes signaling indicative of the measurement;

the signaling associated with the measurement includes signaling indicative of whether the measurement satisfies a condition for configuring, as the relay link, a relay link that includes the candidate communication link;

an operation of receiving, by the UE, signaling to cause the UE to transmit, to a second UE involved in a candidate communication link that is a candidate for inclusion in the relay link, discovery signaling to enable the second UE to perform a measurement associated with the candidate communication link;

the discovery signaling is or includes reference signaling;

the adaptation protocol involves a set of attributes indicative of one or more characteristics of a bearer associated with the relay link;

the set of attributes includes any one or more of: bearer identity such as UC bearer identity, such as a number or other identifier; one or more destination identifiers; one or more source identifiers; total number of bearer segmentations allocated to or otherwise associated with a UE; an indication as to whether a bearer is a duplicate bearer or multiplexing bearer to one or more other bearers; an indication of path or route number or other identifier of a relay path or route; an indication of a total number of UC paths or routes for a UE; an indication of a time stamp or adaptation reference of a relaying bearer for use in adaptation point processing; an indication as to being UC or relay only traffic; an indication to a control operation;

the traffic includes bearer data and an adaptation header that includes information indicative of the set of attributes;

the relay link is a secondary relay link in addition to at least a primary relay link between the remote UE and the wireless communication network;

the communicating at 1604 involves communicating the traffic between the remote UE and the wireless communication network over the primary relay link and the secondary relay link;

the communicating involves performing one or more of: splitting data for transmission over the primary relay link and the secondary relay link; aggregating data received over the primary relay link and the secondary relay link; relaying the traffic along the primary relay link and the secondary relay link;

the primary relay link is a link between the UE and first network equipment in the wireless communication network, and the secondary relay link is a link between the UE and second network equipment in the wireless communication network;

the UE is a relay UE of the relay link;

as noted above, the UE may be the remote UE;

the UE is outside a coverage area of the wireless communication network, and the receiving at 1602 involves receiving the signaling from a further UE that is within the coverage area of the wireless communication network.

According to another aspect of the present disclosure, programming includes instructions to cause a processor to perform a method that involves communicating, in a wireless communication network, signaling to enable relay-based UC by a group of UEs that includes at least a relay UE and a remote UE; and communicating a configuration in the wireless communication network. The configuration includes an adaptation protocol for processing of UC bearer traffic, the UC bearer traffic includes a UC bearer and UC bearer attributes, and the UC bearer includes either a split PDCP bearer or a duplicated PDCP bearer indicated in the UC bearer attributes.

Embodiments that are implemented using an apparatus or computer program product may include any one or more of the following features, and/or others disclosed herein, in any of various combinations:

the UC bearer attributes include any one or more of: a UC bearer identity; a UC bearer index; one or more destination identifiers; one or more source identifiers; a total number of UC bearer streams processed from the associated PDCP bearer; an indication of whether the UC bearer comprises a split PDCP bearer or a duplicated PDCP bearer; an indication of an identifier of a relay path or route; an indication of a total number of UC paths or routes for a UE; an indication of a time stamp or adaptation reference at each adaptation processing point over relaying; an indication as to UC or relay only traffic; an indication to a control operation;

the programming includes instructions for communicating the UC bearer traffic with the remote UE;

communicating the UC bearer traffic with the remote UE involves relaying the UC bearer traffic, the relaying including PHY, MAC, RLC, and AP layer processing, and forwarding the UC bearer traffic based on the UC bearer attributes;

the relaying further includes receiving the UC bearer traffic over a first air interface, and an air interface conversion to associated PHY, MAC, and RLC layers for the forwarding of the UC bearer traffic over a second air interface of a different type than the first air interface;

the first air interface and the second air interface include an access air interface and a sidelink air interface;

the programming includes instructions for receiving the UC bearer traffic at the remote UE and aggregating the split PDCP bearer or conducting joint detection of the duplicated PDCP bearer in the UC bearer traffic;

the programming includes instructions for splitting or duplicating the PDCP bearer to generate the UC bearer traffic, and transmitting the UC bearer traffic from the remote UE;

communicating the configuration involves transmitting, by a base station or a master relay UE, a UE configuration for each UE in the group of UEs;

the configuration includes the AP for processing the UC bearer traffic by a network device;

the programming includes instructions for communicating, by the network device, the UC bearer traffic with one or both of: the relay UE, and the remote UE directly;

communicating the signaling and communicating the configuration each involve unicast or group cast signaling;

communicating the signaling and communicating the configuration involve communicating both the signaling and the configuration in the same signaling;

the relay-based UC and the configuration being pre-configured, semi-statically configured, or dynamically configured.

In embodiments that are implemented using an apparatus that includes a communication interface, features such as communicating signaling, for example, involve communicating signaling through the communication interface. Other features may similarly involve a communication interface or other apparatus components. Some features may also or instead involve programming instructions that cause operations to be performed in any of various ways, and/or additional instructions to cause a processor to perform additional operations.

Figure 18:
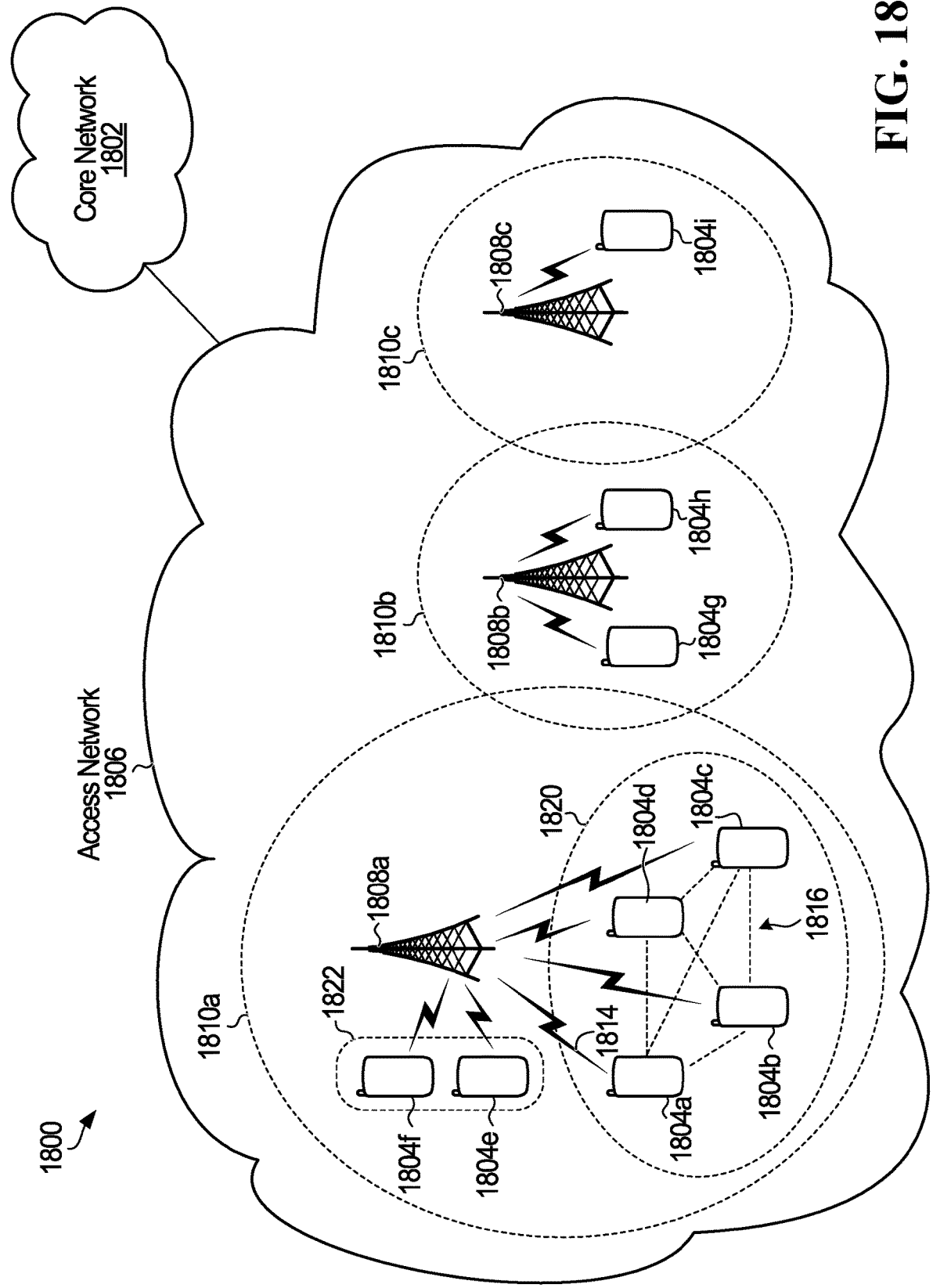
FIG. 18 is a block diagram illustrating an example of a telecommunications network according to one embodiment.

FIG. 18 is a block diagram illustrating an example of a telecommunications network 1800 according to one embodiment. The telecommunications network 1800 includes a core network 1802 and an access network 1806. The access network 1806 serves a plurality of UEs 1804a, 1804b, 1804c, 1804d, 1804e, 1804f, 1804g, 1804h, and 1804i. The access network 1806 is an Evolved Universal Terrestrial Access (E-UTRA) network in some embodiments. Another example of an access network 1806 is a cloud access network (C-RAN). The access network 1806 includes a plurality of BSs 1808a, 1808b, and 1808c. The BSs 1808a-c each provide a respective wireless coverage area 1810a, 1810b, and 1810c, also referred to as a cell. Each of the BSs 1808a-c could be implemented using a radio transceiver, one or more antennas, and associated processing circuitry, such as antenna radio frequency (RF) circuitry, one or more analog-to-digital converters, one or more digital-to-analog converters, etc.

Although not illustrated, the BSs 1808a-c are each connected to the core network 1802, either directly or through one or more central processing hubs, such as servers. The BSs 1808a-c could serve as a gateway between the wireline and wireless portion of the access network 1806.

Each one of BSs 1808a-c may instead be referred to as a base transceiver station, a radio BS, a network node, a transmit node, a transmit point, a Node B, an eNode B, a remote radio head (RRH), or otherwise, depending upon the implementation.

In operation, the plurality of UEs 1804*a-i* access the telecommunications network 1800 using the access network 1806 by wirelessly communicating with one or more of the BSs 1808*a-c*.

UEs 1804*a-d* are in close proximity to each other. Although the UEs 1804*a-d* can each wirelessly communicate with the BS 1808*a*, they can also directly communicate with each other, as represented at 1816. The communications represented at 1816 are direct communications between UEs, such as sidelink communications as disclosed herein, that do not go through an access network component, such as a BS. As shown in FIG. 18, UE to UE communications 1816 are directly between the UEs 1804*a-d* and are not routed through the BS 1808*a*, or any other part of the access network 1806. Communications 1816 may also be referred to as lateral communications. In embodiments disclosed herein, UE to UE communications use a sidelink channel and a sidelink air interface. On the other hand, a communication between an access network component, such as BS 1808*a*, and a UE, as in communication 1814, is called an access communication. An access communication occurs over an access channel, which can be a uplink or downlink channel, and an access communication uses a radio access communication interface, such as a cellular radio access air interface. Access and sidelink air interfaces may use different transmission formats, such as different waveforms, different multiple access schemes, or different radio access technologies. Some examples of radio access technologies that could be used by an access air interface or a sidelink air interface are: Long Term Evolution (LTE), LTE License Assisted Access (LTE-LAA), and WiFi.

By using the sidelink communications 1816, the UEs 1804*a-d* may be able to assist with wireless communications between the UEs 1804*a-d* and the BS 1808*a*. As one example, if UE 1804*c* fails to correctly decode a packet received from the BS 1808*a* but UE 1804*d* is able to receive and correctly decode the packet from the BS 1808*a*, then UE 1804*d* could directly transmit the decoded packet to UE 1804*c* using sidelink communications 1816. As another example, if UE 1804*c* moves out of wireless coverage area 1810*c*, such that UE 1804*c* can no longer wirelessly communicate with the BS 1808*a*, then UE 1804*b* could forward messages between the UE 1804*c* and the BS 1808*a*. As another example, UE 1804*a* and UE 1804*c* could both receive a signal transmitted from the BS 1808*a* that carries a packet meant for UE 1804*c*. UE 1804*a* may then transmit to UE 1804*c*, via sidelink communications 1816, the signal as received by UE 1804*a*. UE 1804*c* may then use the information received from UE 1804*a* to help decode the packet from the BS 1808*a*. In these examples, capacity or coverage may be enhanced through the assistance of one or more of the UEs 1804*a*, 1804*b*, and 1804*d*.

The UEs 1804*a-d* form a UE group 1820 in some embodiments. It should be noted, however, that relay links as disclosed herein are not dependent upon UE groups.

The access network 1806 could assign a group identifier (ID) to the UE group 1820. The UE group ID may allow the access network 1806 to address the UE group 1820 as a whole and distinguish the UE group 1820 from other UE groups. The UE group ID may also be used to broadcast information within the UE group; that is, address all other UEs within the UE group 1820. The UE group 1820 may form a logical or virtual device mesh in which the members of the UE group 1820 communicate amongst themselves using UE communications over a sidelink air interface, but the UE group 1820 as a whole acts as a single distributed virtual transceiver with respect to the access network 1806. The UE group ID may be a group radio network temporary identifier (G-RNTI), for example.

When a particular UE in the UE group 1820, such as the UE 1804*c*, is being assisted or is to be assisted with wireless communication between that UE and the BS 1808*a*, then the other UEs 1804*a*, 1804*b*, and 1804*d* in the group 1820 may be considered candidates to be a relay UE or a helping UE. In a group-based embodiment, the subset of UEs in that actually assist the UE 1804*c* form a cooperation active set or a cooperation group. The cooperation active set may be dynamically selected to assist the UE 1804*c*.

In UE group 1820, UEs 1804*a*, 1804*b*, and 1804*d* form a cooperation candidate set. If UEs 1804*a* and 1804*b* actually assist the UE 1804*c*, then the UEs 1804*a* and 1804*b* form the cooperation active set. As UEs 1804*a-d* move around, some may leave the UE group 1820. UE movement may also or instead result in other UEs joining the UE group 1820. Therefore, the cooperation candidate set may change over time. For example, the cooperation candidate set may change semi-statically. The UE group 1820 may also be terminated by the network 1806, for example, if the network determines that there is no longer a need or opportunity for the UE group 1820 to provide assistance in wireless communication between the BS 908*a* and members of the UE group 1820.

There may be more than one UE group. For example, UEs 1804*e* and 1804*f* in FIG. 18 form another UE group 1822.

Figure 19:
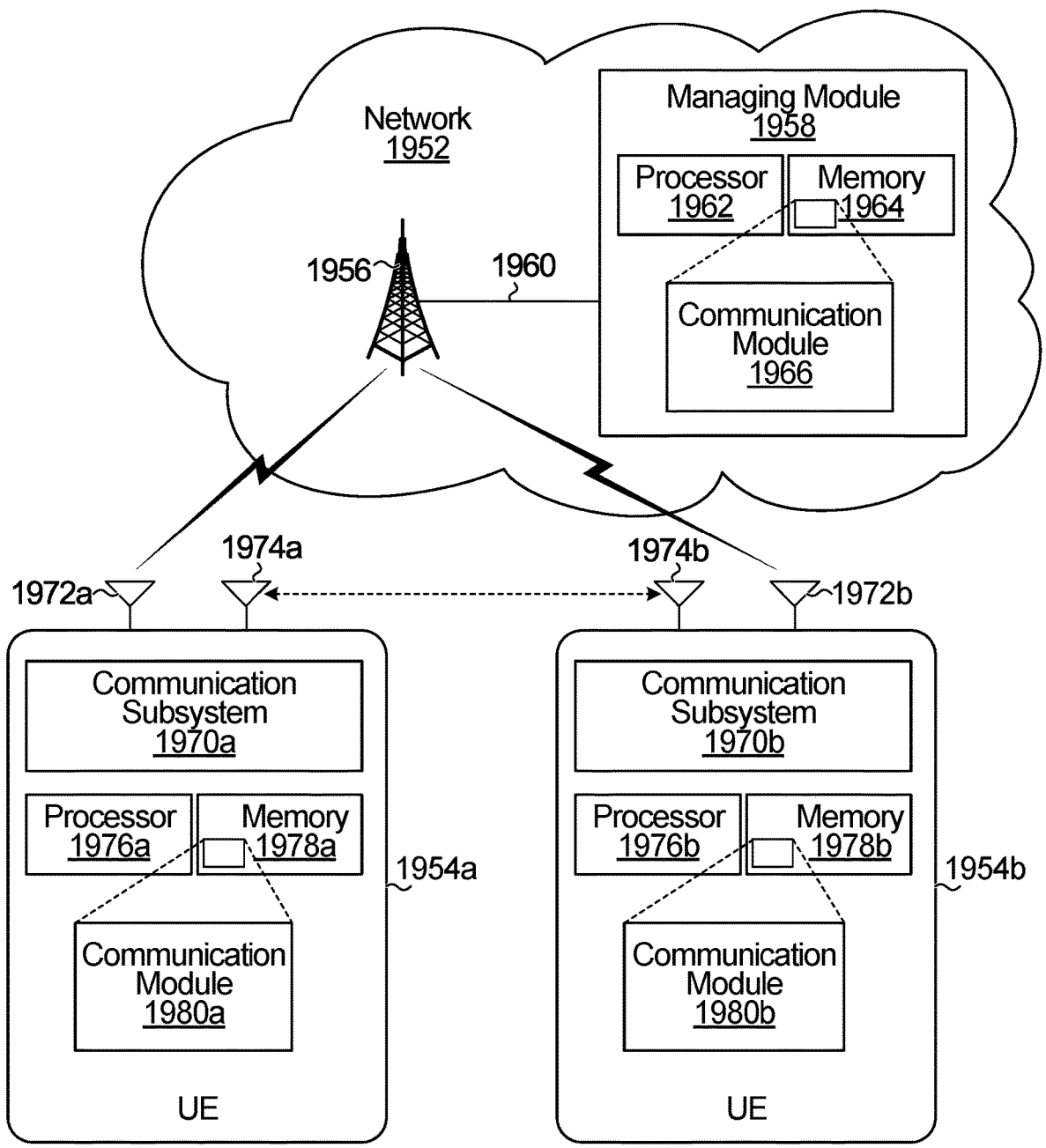
FIG. 19 is a block diagram illustrating an example of a network serving two UEs.

FIG. 19 is a block diagram illustrating an example of a network 1952 serving two UEs 1954*a* and 1954*b*, according to one embodiment. The network 1952 may be the access network 1806 from FIG. 18, and the two UEs 1954*a* and 1954*b* may be two of the four UEs 1804*a-d* in FIG. 18, or the UEs 1954*a* and 1954*b* may be UEs 1804*e* and 1804*f* in FIG. 18. However, more generally this need not be the case, which is why different reference numerals are used in FIG. 19.

The network 1952 includes a BS 1956 and a managing module 1958. The managing module 1958 instructs the BS 1956 to perform actions. The managing module 1958 is illustrated as physically separate from the BS 1956 and coupled to the BS 1956 via a communication link 1960. For example, the managing module 1958 may be part of a server in the network 1952. Alternatively, the managing module 1958 may be part of the BS 1956.

The managing module 1958 includes a processor 1962, a memory 1964, and a communication module 1966. The communication module 1966 is implemented by the processor 1962 when the processor 1962 accesses and executes a series of instructions stored in the memory 1964, the instructions defining the actions of the communication module 1966. When the instructions are executed, the communication module 1966 causes the BS 1956 to perform the actions described herein so that the network 1952 can establish, coordinate, instruct, or control relay, and possibly perform such operations in respect of UE groups. Alternatively, the communication module 1966 may be implemented using dedicated circuitry, such as an application specific integrated circuit (ASIC) or a programmed field programmable gate array (FPGA).

The UE 1954*a* includes a communication subsystem 1970*a*, two antennas 1972*a* and 1974*a*, a processor 1976*a*, and a memory 1978*a*. The UE 1954*a* also includes a communication module 1980*a*. The communication module 1980*a* is implemented by the processor 1976*a* when the processor 1976*a* accesses and executes a series of instructions stored in the memory 1978*a*, the instructions defining the actions of the communication module 1980*a*. When the instructions are executed, the communication module 1980*a* causes the UE 1954*a* to perform actions described herein in relation to one or more of a relay UE, a helping UE, and a remote UE. Features related to establishing and participating in a UE group may also be supported. Alternatively, the module 1980*a* may be implemented by dedicated circuitry, such as an ASIC or an FPGA.

The communication subsystem 1970*a* includes processing circuitry, transmit circuitry, and receive circuitry for sending messages from and receiving messages at the UE 1954*a*. Although one communication subsystem 1970*a* is illustrated, the communication subsystem 1970*a* may be multiple communication subsystems. Antenna 1972*a* transmits wireless communication signals to, and receives wireless communications signals from, the BS 1956. Antenna 1974*a* transmits sidelink communication signals to, and receives sidelink communication signals from, other UEs, including UE 1954*b*. In some implementations there may not be two separate antennas 1972*a* and 1974*a*. A single antenna may be used. Alternatively, there may be several antennas, but not separated into antennas dedicated only to sidelink communication and antennas dedicated only to communicating with the BS 1956.

SL communications could be over Wi-Fi, in which case the antenna 1974*a* may be a Wi-Fi antenna. Alternatively, the sidelink communications could be over Bluetooth™, in which case the antenna 1974*a* may be a Bluetooth™ antenna. Sidelink communications could also or instead be over licensed or unlicensed spectrum.

The UE 1954*b* includes the same components described above with respect to the UE 1954*a*. That is, UE 1954*b* includes communication subsystem 1970*b*, antennas 1972*b* and 1974*b*, processor 1976*b*, memory 1978*b*, and communication module 1980*b*.

FIGS. 18 and 19 illustrate systems in which embodiments could be implemented. In some embodiments, a UE includes a processor, such as 1976*a*, 1976*b* in FIG. 19, and a non-transitory computer readable storage medium, such as 1978*a*, 1978*b* in FIG. 19, storing programming for execution by the processor. A non-transitory computer readable storage medium could also or instead be provided separately, as a computer program product. Examples are provided elsewhere herein.

The present disclosure encompasses several embodiments to support UC. UC scenarios consistent with the present disclosure include UC among network equipment, one or more relay UEs and one or more remote UE(s), where UC processing ends between network equipment and a remote UE, thus UC involving Uu and sidelink communications, and possibly one or more multi-hop links. Sidelink-only UC among relay UEs and one or more remote UE(s) is also contemplated, in which UC processing ends between a master relay UE and a remote UE, thus UC involving only sidelink communications, possibly with one or more multi-hop links. DC or CA designs are possible, and involve two or more BSs or other network equipment having respective connections to a UE. UE connections may include either or both of direct Uu link connections and relay link connections with one or more hops.

Another aspect of the present disclosure relates to an AP context for supporting UC with relaying that involves more than one hop. With L2 relaying and only one hop, from a BS through a single relay UE and then to a remote UE for example, an AP context could include a fixed mapping relationship between the relay UE and the remote UE. In UC related AP, a destination device such as a remote UE may receive UC traffic from multiple relay paths for processing, for example by aggregating the received UC traffic back to an original PDCP bearer or message. Moreover, the relaying process or path can include multiple hops through more than one relaying UE or device, and thus an AP context for UC as disclosed herein may include more information than the other L2 relaying based AP contexts. For example, a UC AP context (or attributes) may include a destination address associated with a remote UE or other destination, and any relay UE in a UC group can recognize this address and forward the traffic along a relay link or path. Attributes associated with a UC AP context may also or instead include individual split or duplication traffic identities or indices (e.g., 1 out of 3 split portions or duplicate copies), an indication as to whether a split or duplication operation used at a transmitting end, and/or other attributes described elsewhere herein.

The present disclosure encompasses various embodiments, including the following examples.

According to an example 1, a method comprises: determining wireless network connectivity that is available for a relay link between a UE and a wireless communication network; determining an adaptation protocol, based on the determined connectivity, to adapt a protocol stack architecture associated with the determined connectivity to supporting the relay link; and communicating signaling to enable configuration of the relay link in accordance with the connectivity and the adaptation protocol.

An example 2 relates to the method of example 1, wherein determining wireless network connectivity comprises determining the connectivity based on a measurement associated with a candidate communication link that is a candidate for inclusion in the relay link.

An example 3 relates to the method of example 2, wherein determining the connectivity based on the measurement comprises receiving, from a component that is involved in the candidate communication link, signaling associated with the measurement.

An example 4 relates to the method of example 2, further comprising: communicating signaling to cause a first component that is involved in the candidate communication link to transmit, to a second component that is involved in the candidate communication link, discovery signaling to enable the second component to perform the measurement, wherein determining the connectivity based on the measurement comprises receiving, from the second component, signaling associated with the measurement.

An example 5 relates to the method of example 4, wherein the discovery signaling comprises reference signaling.

An example 6 relates to the method of any one of examples 3 to 5, wherein the signaling associated with the measurement comprises one or more of: signaling indicative of the measurement, and signaling indicative of whether the measurement satisfies a condition for configuring, as the relay link, a relay link that includes the candidate communication link.

An example 7 relates to the method of any one of examples 1 to 6, wherein determining the adaptation protocol comprises configuring a set of attributes indicative of one or more characteristics of a bearer associated with the relay link.

An example 8 relates to the method of example 7, wherein the set of attributes includes any one or more of: bearer identity, such as a number or other identifier; one or more destination identifiers; one or more source identifiers; total number of bearer segmentations allocated to or otherwise associated with a UE; an indication as to whether a bearer is a duplicate bearer or multiplexing bearer to one or more other bearers; an indication of path or route number or other identifier of a relay path or route; an indication of a total number of UC paths or routes for a UE; an indication of a time stamp or adaptation reference of a relaying bearer for use in adaptation point processing; an indication as to being UC or relay only traffic; and an indication to a control operation.

An example 9 relates to the method of example 7 or example 8, further comprising: communicating traffic between the UE and the wireless communication network over the relay link, the traffic comprising bearer data and an adaptation header comprising information indicative of the set of attributes.

An example 10 relates to the method of any one of examples 1 to 9, wherein the relay link comprises a secondary relay link in addition to at least a primary relay link between the UE and the wireless communication network, the method further comprising: communicating traffic between the UE and the wireless communication network over the primary relay link and the secondary relay link.

An example 11 relates to the method of example 10, wherein the communicating comprises performing one or more of: splitting data for transmission over the primary relay link and the secondary relay link; aggregating data received over the primary relay link and the secondary relay link.

An example 12 relates to the method of any one of examples 1 to 9, wherein the relay link comprises a secondary relay link in addition to at least a primary relay link between the UE and the wireless communication network, wherein the primary relay link comprises a link between the UE and first network equipment in the wireless communication network, and wherein the secondary relay link comprises a link between the UE and second network equipment in the wireless communication network.

An example 13 relates to the method of example 10 or example 11, wherein the primary relay link comprises a link between the UE and first network equipment in the wireless communication network, and wherein the secondary relay link comprises a link between the UE and second network equipment in the wireless communication network.

An example 14 relates to the method of any one of examples 1 to 13, performed by network equipment in the wireless communication network.

An example 15 relates to the method of any one of examples 1 to 9, wherein the relay link comprises a secondary relay link in addition to at least a primary relay link between the UE and the wireless communication network, the method being performed by a relay UE of the primary relay link.

An example 16 relates to the method of example 10 or example 11, the method being performed by a relay UE of the primary relay link.

An example 17 relates to a method comprising: receiving, by a UE, signaling to configure the UE for a relay link between a remote UE and a wireless communication network in accordance with wireless network connectivity that is available for the relay link and an adaptation protocol that is based on the connectivity to adapt a protocol stack architecture associated with the determined connectivity to supporting the relay link; and communicating, by the UE, traffic between the remote UE and the wireless communication network over the relay link.

An example 18 relates to the method of example 17, further comprising: performing, by the UE, a measurement associated with a candidate communication link that is a candidate for inclusion in the relay link; and transmitting, by the UE, signaling associated with the measurement.

An example 19 relates to the method of example 18, wherein the signaling associated with the measurement comprises one or more of: signaling indicative of the measurement, and signaling indicative of whether the measurement satisfies a condition for configuring, as the relay link, a relay link that includes the candidate communication link.

An example 20 relates to the method of example 17, further comprising: receiving, by the UE, signaling to cause the UE to transmit, to a second UE involved in a candidate communication link that is a candidate for inclusion in the relay link, discovery signaling to enable the second UE to perform a measurement associated with the candidate communication link.

An example 21 relates to the method of example 20, wherein the discovery signaling comprises reference signaling.

An example 22 relates to the method of any one of examples 17 to 21, wherein the adaptation protocol comprises a set of attributes indicative of one or more characteristics of a bearer associated with the relay link.

An example 23 relates to the method of example 22, wherein the set of attributes includes any one or more of: bearer identity, such as a number or other identifier; one or more destination identifiers; one or more source identifiers; total number of bearer segmentations allocated to or otherwise associated with a UE; an indication as to whether a bearer is a duplicate bearer or multiplexing bearer to one or more other bearers; an indication of path or route number or other identifier of a relay path or route; an indication of a total number of UC paths or routes for a UE; an indication of a time stamp or adaptation reference of a relaying bearer for use in adaptation point processing; an indication as to being UC or relay only traffic; and an indication to a control operation.

An example 24 relates to the method of example 22 or example 23, wherein the traffic comprises bearer data and an adaptation header comprising information indicative of the set of attributes.

An example 25 relates to the method of any one of examples 17 to 24, wherein the relay link comprises a secondary relay link in addition to at least a primary relay link between the remote UE and the wireless communication network, and wherein the communicating comprises communicating the traffic between the remote UE and the wireless communication network over the primary relay link and the secondary relay link.

An example 26 relates to the method of example 25, wherein the communicating comprises performing one or more of: splitting data for transmission over the primary relay link and the secondary relay link; aggregating data received over the primary relay link and the secondary relay link; relaying the traffic along the primary relay link and the secondary relay link.

An example 27 relates to the method of any one of exampled 17 to 24, wherein the relay link comprises a secondary relay link in addition to at least a primary relay link between the UE and the wireless communication network, wherein the primary relay link comprises a link between the UE and first network equipment in the wireless communication network, and wherein the secondary relay link comprises a link between the UE and second network equipment in the wireless communication network.

An example 28 relates to the method of example 25 or example 26, wherein the primary relay link comprises a link between the UE and first network equipment in the wireless communication network, and wherein the secondary relay link comprises a link between the UE and second network equipment in the wireless communication network.

An example 29 relates to the method of any one of examples 17 to 26, wherein the UE is a relay UE of the relay link.

An example 30 relates to the method of any one of examples 17 to 26, wherein the UE is the remote UE.

An example 31 relates to the method of example 30, wherein the UE is outside a coverage area of the wireless communication network, and wherein receiving signaling to configure the UE for a relay link comprises receiving the signaling from a further UE that is within the coverage area of the wireless communication network.

An example 32 relates to an apparatus comprising: a communication interface; a processor, coupled to the communication interface; and a non-transitory computer readable storage medium, coupled to the processor, storing programming for execution by the processor, the programming including instructions to perform the method of any one of examples 1 to 31.

An example 33 relates to a computer program product comprising a non-transitory computer readable storage medium storing programming, the programming including instructions to perform the method of any one of examples 1 to 31.

What has been described is merely illustrative of the application of principles of embodiments of the present disclosure. Other arrangements and methods can be implemented by those skilled in the art.

For example, although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment could be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Although aspects of the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although embodiments and potential advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

In addition, although described primarily in the context of methods and apparatus, other implementations are also contemplated, as instructions stored on a non-transitory computer-readable medium, for example. Such media could store programming or instructions to perform any of various methods consistent with the present disclosure.

Moreover, any module, component, or device exemplified herein that executes instructions may include or otherwise have access to a non-transitory computer readable or processor readable storage medium or media for storage of information, such as computer readable or processor readable instructions, data structures, program modules, and/or other data. A non-exhaustive list of examples of non-transitory computer readable or processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer readable or processor readable storage media may be part of a device or accessible or connectable thereto. Any application or module herein described may be implemented using instructions that are readable and executable by a computer or processor may be stored or otherwise held by such non-transitory computer readable or processor readable storage media.

What is claimed is:

1. A method comprising:
  receiving, by a relay user equipment (UE), signaling comprising a configuration of adaptation protocol (AP) parameters for a group of UEs, the group of UEs comprising the relay UE and a remote UE, and the AP parameters for configuring the relay UE to relay traffic between a base station and the remote UE, wherein the AP parameters comprise a remote UE identity for identifying the remote UE and a bearer identity for identifying a bearer of the traffic;
  receiving, by the relay UE, the traffic from one of the base station or the remote UE, the traffic comprising packet data and the AP parameters; and
  transmitting, by the relay UE, the traffic comprising the packet data and the AP parameters towards the other one of the base station or the remote UE,
  wherein the AP parameters are configured for the relay UE to receive the traffic at a first interface of the relay UE, and to transmit the traffic at a second interface of the relay UE,
  wherein the first interface and the second interface include an access (Uu) interface comprising a respective radio link control (RLC) layer and a sidelink (PC5) interface comprising a respective RLC layer, wherein the AP parameters are associated with a respective AP layer that is located above each of the respective RLC layer of the access interface and the respective RLC layer of the sidelink interface, and are included in respective AP headers that are the same for the access interface and the sidelink interface, wherein each of the respective AP headers comprises the AP parameters of the remote UE identity for identifying the remote UE and the bearer identity for identifying the bearer of the traffic.

2. The method of claim 1,
wherein the method further comprises either or both of:
converting, by the relay UE based on the AP parameters and upon receiving the traffic at the access interface with the AP header for the access interface, the traffic with the AP header for the access interface in the AP layer that is located above the RLC layer of the access interface to the traffic with the AP header for the sidelink interface in the AP layer that is located above the RLC layer of the sidelink interface; or
converting, by the relay UE based on the AP parameters and upon receiving the traffic at the sidelink interface with the AP header for the sidelink interface, the traffic with the AP header for the sidelink interface in the AP layer that is located above the RLC layer of the sidelink interface to the traffic with the AP header for the access interface in the AP layer that is located above the RLC layer of the access interface.

3. The method of claim 1, wherein the adaptation protocol is associated with a packet format comprising the respective AP headers and a data part, and wherein the data part comprises the packet data.

4. The method of claim 1, wherein the signaling comprising the configuration of the AP parameters is Radio Resource Control signaling.

5. A method comprising:
transmitting, by a base station, signaling to a relay user equipment (UE), the signaling comprising a configuration of adaptation protocol (AP) parameters for a group of UEs, the group of UEs comprising the relay UE and a remote UE, and the AP parameters for configuring the relay UE to relay traffic between the base station and the remote UE, wherein the AP parameters comprise a remote UE identity for identifying the remote UE and a bearer identity for identifying a bearer of the traffic; and
transmitting or receiving the traffic by the base station at an access (Uu) interface of the base station, the traffic comprising packet data and the AP parameters,
wherein transmitting the traffic comprises transmitting the traffic to the relay UE, for the relay UE to forward the traffic to the remote UE,
wherein receiving the traffic comprises receiving the traffic from the relay UE, the traffic being forwarded from the remote UE by the relay UE,
wherein the AP parameters are configured for the relay UE to transmit the traffic to or receive the traffic from the base station at an access (Uu) interface of the relay UE, and to relay the traffic to or from the remote UE at a sidelink (PC5) interface of the relay UE,
wherein the access interface of the base station comprises a respective radio link control (RLC) layer, the access interface of the relay UE comprises a respective radio link control (RLC) layer, and the sidelink interface of the relay UE comprises a respective RLC layer, and
wherein the AP parameters are associated with a respective AP layer that is located above each of the respective RLC layer of the access interface of the base station, the respective RLC layer of the access interface of the relay UE, and the respective RLC layer of the sidelink interface of the relay UE, and are included in respective AP headers that are the same for the access interface of the base station, the access interface of the relay UE, and the sidelink interface of the relay UE, wherein each of the respective AP headers comprises the AP parameters of the remote UE identity for identifying the remote UE and the bearer identity for identifying the bearer of the traffic.

6. An apparatus comprising:
a processor;
a non-transitory computer readable storage medium, coupled to the processor, storing programming for execution by the processor, the programming including instructions for the apparatus to:
receive signaling comprising a configuration of adaptation protocol (AP) parameters for a group of user equipments (UEs), the group of UEs comprising a remote UE and a relay UE that includes the apparatus, and the AP parameters for configuring the relay UE to relay traffic between a base station and the remote UE, wherein the AP parameters comprise a remote UE identity for identifying the remote UE and a bearer identity for identifying a bearer of the traffic;
receive the traffic from one of the base station or the remote UE, the traffic comprising packet data and the AP parameters; and
transmit the traffic comprising the packet data and the AP parameters towards the other one of the base station or the remote UE,
wherein the AP parameters are configured for the relay UE to receive the traffic at a first interface of the relay UE, and to transmit the traffic at a second interface of the relay UE,
wherein the first interface and the second interface include an access (Uu) interface comprising a respective radio link control (RLC) layer and a sidelink (PC5) interface comprising a respective RLC layer,
wherein the AP parameters are associated with a respective AP layer that is located above each of the respective RLC layer of the access interface and the respective RLC layer of the sidelink interface, and are included in respective AP headers that are the same for the access interface and the sidelink interface, wherein each of the respective AP headers comprises the AP parameters of the remote UE identity for identifying the remote UE and the bearer identity for identifying the bearer of the traffic.

7. The apparatus of claim 6,
wherein the programming further includes either or both of:
instructions for the apparatus to convert, based on the AP parameters and upon receiving the traffic at the access interface with the AP header for the access interface, the traffic with the AP header for the access interface in the AP layer that is located above the RLC layer of the access interface to the traffic with the AP header for the sidelink interface in the AP layer that is located above the RLC layer of the sidelink interface; or
instructions for the apparatus to convert, based on the AP parameters and upon receiving the traffic at the sidelink interface with the AP header for the sidelink interface, the traffic with the AP header for the sidelink interface in the AP layer that is located above the RLC layer of the sidelink interface to the traffic with the AP header for the access interface in the AP layer that is located above the RLC layer of the access interface.

8. The apparatus of claim 6, wherein the adaptation protocol is associated with a packet format comprising the respective AP headers and a data part, and wherein the data part comprises the packet data.

9. The apparatus of claim 6, wherein the signaling comprising the configuration of the AP parameters is Radio Resource Control signaling.

10. An apparatus comprising:
- a processor;
- a non-transitory computer readable storage medium, coupled to the processor, storing programming for execution by the processor, the programming including instructions for the apparatus to:
- transmit signaling to a relay user equipment (UE), the signaling comprising a configuration of adaptation protocol (AP) parameters for a group of UEs, the group of UEs comprising the relay UE and a remote UE, and the AP parameters for configuring the relay UE to relay traffic between the base station and the remote UE, wherein the AP parameters comprise a remote UE identity for identifying the remote UE and a bearer identity for identifying a bearer of the traffic; and
- transmit or receive the traffic at an access (Uu) interface of the apparatus, the traffic comprising packet data and the AP parameters,
- wherein the instructions for the apparatus to transmit or receive the traffic comprise instructions for the apparatus to:
- transmit the traffic to the relay UE, for the relay UE to forward the traffic to the remote UE, or
- receive the traffic from the relay UE, the traffic being forwarded from the remote UE by the relay UE,
- wherein the AP parameters are configured for the relay UE to transmit the traffic to or receive the traffic from the base station at an access (Uu) interface of the relay UE, and to relay the traffic to or from the remote UE at a sidelink (PC5) interface of the relay UE,
- wherein the access interface of the apparatus comprises a respective radio link control (RLC) layer, the access interface of the relay UE comprises a respective radio link control (RLC) layer, and the sidelink interface of the relay UE comprises a respective RLC layer,
- wherein the AP parameters are associated with a respective AP layer that is located above each of the respective RLC layer of the access interface of the apparatus, the respective RLC layer of the access interface of the relay UE, and the respective RLC layer of the sidelink interface of the relay UE, and are included in respective AP headers that are the same for the access interface of the apparatus, the access interface of the relay UE, and the sidelink interface of the relay UE, wherein each of the respective AP headers comprises the AP parameters of the remote UE identity for identifying the remote UE and the bearer identity for identifying the bearer of the traffic.

* * * * *